United States Patent
Adogla

(10) Patent No.: US 12,327,127 B2
(45) Date of Patent: *Jun. 10, 2025

(54) TECHNIQUES FOR BOOTSTRAPPING ACROSS SECURE AIR GAPS WITH STATIC SIDECAR

(71) Applicant: Oracle International Corporation, Redwood Shores, CA (US)

(72) Inventor: Eden Adogla, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 183 days.

This patent is subject to a terminal disclaimer.

(21) Appl. No.: 17/830,261

(22) Filed: Jun. 1, 2022

(65) Prior Publication Data

US 2023/0393858 A1 Dec. 7, 2023

(51) Int. Cl.
  G06F 9/44 (2018.01)
  G06F 9/4401 (2018.01)
(52) U.S. Cl.
  CPC ................... G06F 9/4416 (2013.01)
(58) Field of Classification Search
  None
  See application file for complete search history.

(56) References Cited

U.S. PATENT DOCUMENTS

| | | | |
|---|---|---|---|
| 6,560,706 B1 | 5/2003 | Carbajal et al. | |
| 8,769,127 B2 | 7/2014 | Selimis et al. | |
| 9,998,426 B2 | 6/2018 | Fischer et al. | |
| 11,201,814 B2 * | 12/2021 | Seligson | H04L 12/4625 |
| 11,457,080 B1 | 9/2022 | Meduri et al. | |
| 11,483,293 B1 | 10/2022 | Spain et al. | |
| 11,683,299 B2 | 6/2023 | Kuehnel et al. | |
| 11,853,813 B2 | 12/2023 | Adogla et al. | |
| 11,863,455 B2 | 1/2024 | Adogla et al. | |
| 2021/0258325 A1 | 8/2021 | Meyer et al. | |
| 2022/0022344 A1 * | 1/2022 | Jose | H05K 7/20745 |
| 2023/0164224 A1 | 5/2023 | Adogla et al. | |
| 2023/0251871 A1 | 8/2023 | Miller et al. | |

(Continued)

OTHER PUBLICATIONS

Cross-Domain Solutions with AWS, Amazon AWS Whitepaper, Available online at: https://docs.aws.amazon.com/pdfs/whitepapers/latest/cross-domain-solutions/cross-domain-solutions.pdf, Feb. 2, 2021, 24 pages.

(Continued)

*Primary Examiner* — Fahmida Rahman
(74) *Attorney, Agent, or Firm* — Kilpatrick Townsend & Stockton LLP

(57) ABSTRACT

Techniques are disclosed for bootstrapping a secure data center using a cross domain system with a static sidecar node. The cross domain system can be implemented at the secure data center to provide one-way ingress and egress channels for network traffic to the target data center. The cross domain system is connected to a host data center and can receive configuration data from the host data center to configure the static sidecar node. The static sidecar node can receive bootstrapping data from the host data center and store the bootstrapping data. The bootstrapping data can include software resources for provisioning services in the secure data center. The received bootstrapping data passes into the secure data center via the ingress channel.

20 Claims, 13 Drawing Sheets

(56) References Cited

U.S. PATENT DOCUMENTS

2023/0393858 A1 12/2023 Adogla
2023/0396590 A1 12/2023 Adogla

OTHER PUBLICATIONS

Fundamentals of Cross Domain Solutions, Australian Government—Australian Signals Directorate, Dec. 2019, 32 pages.
U.S. Appl. No. 17/830,264, Non-Final Office Action mailed on Feb. 22, 2024, 7 pages.
U.S. Appl. No. 17/830,264, Notice of Allowance mailed on Jun. 26, 2024, 5 pages.
U.S. Appl. No. 17/830,262, Non-Final Office Action mailed on Sep. 12, 2024, 27 pages.
U.S. Appl. No. 17/830,264, Notice of Allowance mailed on Oct. 17, 2024, 7 pages.

* cited by examiner

TECHNIQUES FOR BOOTSTRAPPING ACROSS SECURE AIR GAPS WITH STATIC SIDECAR

CROSS REFERENCES TO RELATED APPLICATIONS

The present application is related to the following applications, the entire contents of which are incorporated herein by reference for all purposes:

(1) U.S. Non-Provisional application Ser. No. 17/830,262, filed on the same day, entitled "TECHNIQUES FOR BOOTSTRAPPING ACROSS SECURE AIR GAPS WITH PROXYING SIDECAR,"; and (2) U.S. Non-Provisional application Ser. No. 17/830,264, now U.S. Pat. No. 12,153,933, filed on the same day, entitled "TECHNIQUES FOR BOOTSTRAPPING ACROSS SECURE AIR GAPS WITH EDGE DEVICE CLUSTER".

BACKGROUND

Cloud computing infrastructure and related services may be offered in numerous geographical areas worldwide. A cloud infrastructure provider may operate one or more data centers corresponding to a local geographical area or "region," a logical abstraction of the geographical area and the computing resources of the data centers therein. to provide the cloud computing infrastructure. Building new regions can include provisioning the computing resources, configuring infrastructure, and deploying code to those resources, which can typically be accomplished over network connections to the data centers. However, some customers of the cloud infrastructure provider may demand heightened network security for their regions, including "air-gapped" data centers that have highly restricted connectivity to external public networks. Conventional bootstrapping operations may be challenging over such restricted network interfaces.

BRIEF SUMMARY

Embodiments of the present disclosure relate to building a target region using a cross domain system that strictly controls the ingress and egress of traffic to and from the target region. An automated region build can include bootstrapping (e.g., provisioning and/or deploying) resources (e.g., infrastructure components, artifacts, etc.) for any suitable number of services in a region (e.g., a geographical location associated with one or more data centers). Resources used for bootstrapping (e.g., software artifacts, software images, etc.) may be provided in a bootstrapping environment in an existing region (e.g., one or more data centers of a host region). The bootstrapping environment may be a virtual environment (e.g., a virtual cloud network) within the existing region. The bootstrapping environment may therefore be constructed and configured in the existing region in advance of an automated region build process. The target region may interface with external networks (e.g., public network like the Internet, etc.) using a cross domain system. The cross-domain system (CDS) can be any suitable number of computing devices and/or networking devices (e.g., switches, routers, etc.) to manage networking traffic into and out of the target region. The CDS may be the only networking interface of the target region that is accessible from the region hosting the bootstrapping environment. By using a CDS, the computing resources of the target region data centers, as well as any other computing resources connected to the target region via a private network connection, can be protected from networking threats (e.g., malicious software, attacks, etc.) while still allowing the traffic necessary to perform the automated region build process.

One embodiment is directed to a computer-implemented method that can include implementing a cross domain system comprising a plurality of nodes. The nodes can comprise any suitable number of computing devices (e.g., processors). The nodes can form an ingress channel and an egress channel. The cross domain system may be implemented at a target data center of a target region and may be communicatively connected to a host data center of a host region. The method can also include receiving, at the cross domain system via the ingress channel, configuration data and using the configuration data to configure the plurality of nodes. The configured nodes can include a static node and a receiver node. The static node can receive bootstrapping data from the host data center via the ingress channel through the receiver node. The static node can store the bootstrapping data and act as a repository of the software resources used to provision services in the target data center. The method can also include establishing a network connection between the cross domain system and a seed server in the target data center. The static node can send at least a portion of the bootstrapping data to the seed server.

Another embodiment is directed to a cross domain system including a computing device comprising one or more processors and instructions that, when executed by the one or more processors, cause the computing device to perform the method(s) disclosed herein.

Still another embodiment is directed to a non-transitory computer-readable medium storing computer-executable instructions that, when executed by one or more processors of a cross domain system, cause the cross domain system to perform the method(s) disclosed herein.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
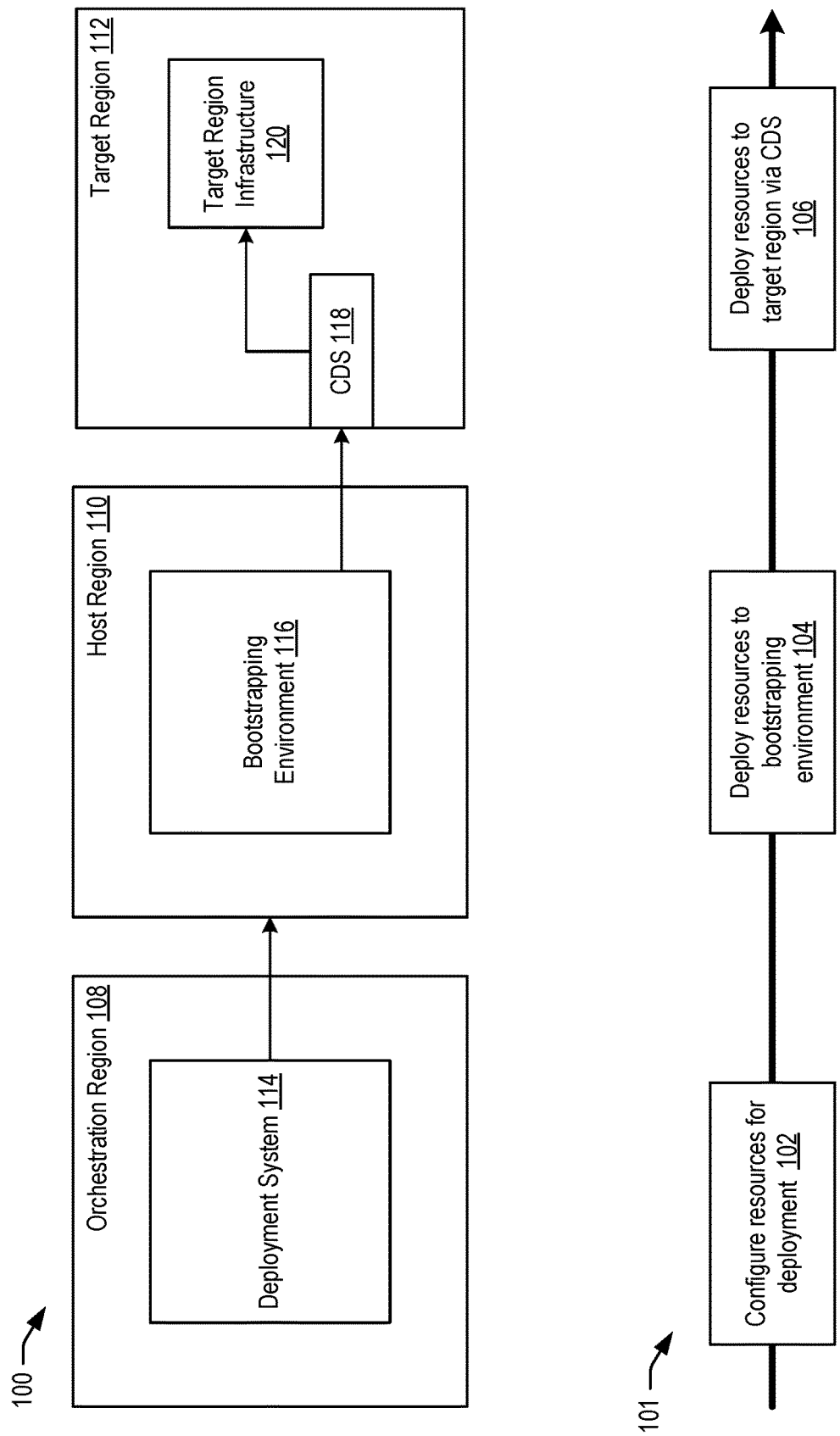
FIG. 1 is a block diagram and associated flow chart of an example process for bootstrapping a target region using a cross domain system, according to at least one embodiment.

Example Automated Data Center Build (Region Build) Infrastructure

The adoption of cloud services has seen a rapid uptick in recent times. Various types of cloud services are now provided by various different cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure and which is used to provide a cloud service to a customer are separate from the customer's own on-premises servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

Data centers within a region may be organized into one or more availability domains, which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

When a customer or subscriber subscribes to or signs up for one or more services provided by a CSP, the CSP creates a tenancy for the customer. The tenancy is like an account that is created for the customer. In certain implementations, a tenancy for a customer exists in a single realm and can access all regions that belong to that realm. The customer's users can then access the services subscribed to by the customer under this tenancy.

In some instances, a region may be built for a specific customer and the region's resources may not be accessible by other tenancies. Certain customers of a CSP (e.g., national and state government agencies) may require heightened security for the cloud computing resources provided by the CSP. For example, a government agency may use the cloud computing resources to process, maintain, and/or manage confidential and/or classified data. Additionally, the computing resources of the region may interface with a secured network of the government agency. Due to security requirements for the classified data, a region provided for the government agency may have limited or no interfaces with external public networks. Such isolation from external networks is commonly referred to as "air-gapping" or an "air gap," with the computing resources connected over a secure network that has few, if any, network connections to external networks. Any external interfaces may be strictly controlled and configured to effectively limit traffic into and out of the interface to preserve the isolation of the protected network, computing resources, and data.

Building a data center (or multiple data centers) in a region is sometimes also referred to as building a region. The term "region build" is used to refer to building one or more data centers in a region. Building a data center in a region involves provisioning or creating a set of new resources that are needed or used for providing a set of services that the data center is configured to provide. The end result of the region build process is the creation of a data center in a region, where the data center is capable of providing a set of services intended for that data center and includes a set of resources that are used to provide the set of services.

Building a new data center in a region is a very complex activity requiring coordination between various teams. At a high level, this involves the performance and coordination of various tasks such as: identifying the set of services to be provided by the data center, identifying various resources that are needed for providing the set of services, creating, provisioning, and deploying the identified resources, wiring the resources properly so that they can be used in an intended manner, and the like. Each of these tasks further have subtasks that need to be coordinated, further adding to the complexity. Due to this complexity, presently, the building of a data center in a region involves several manually-initiated or manually-controlled tasks that require careful manual coordination. As a result, the task of building a new region (i.e., building one or more data centers in a region) is very time consuming. It can take time, for example, many months to build a data center. Additionally, the process is very error prone, sometimes requiring several iterations before a desired configuration of the data center is achieved, which further adds to the time taken to build a data center. These limitations and problems severely limit a CSP's ability to grow in a timely manner responsive to increasing customer needs.

Recent innovations allow CSPs to automate many of the region build operations, reducing the time needed to build data centers and eliminating substantial manual efforts. A CSP may employ an orchestration service to bootstrap services into a new data center. The orchestration service may be a cloud-based service hosted within a separate region (e.g., an orchestration region) from the target region. To bootstrap services into the target region, the orchestration service can create a bootstrapping environment to host instances of one or more cloud services. The orchestration service can then use the services in the bootstrapping environment to support the deployment of services into the target region.

For customers using secure, air-gapped regions, the region build process is complicated by the requirement of limited and/or restricted external network interfaces to support bootstrapping operations from a bootstrapping environment. An air-gapped target region may not be suitably connected to the bootstrapping environment to support traffic for deploying services and/or other resources into the target region. For example, the target region may filters and/or block request traffic from services deployed within the target region, so that deployed services are unable to communicate with bootstrapping services present in the bootstrapping environment. The security posture of the target region may also require The present disclosure is directed to a cross domain system (CDS) that is configured to support an automated bootstrapping operation of the target region. The CDS may be implemented at the target region and act as a networking interface for the target region while enforcing data security policies, data content filtering, content disarm and reconstruction, traffic control, and traffic filtering for the networking connection with the target region. The CDS may be configured to support dynamic bootstrapping operations via a proxying functionality within the CDS, static bootstrapping operations via a static repository functionality within the CDS, and/or configuration of an edge device cluster within the target region to act as a bootstrapping environment.

Certain Definitions

A "region" is a logical abstraction corresponding to a geographical location. A region can include any suitable number of one or more execution targets. In some embodiments, an execution target could correspond to a data center.

A "cross domain system" (CDS) refers to a combination of software and hardware configured to enforce restrictions on traffic between two security domains according to one or more security policies. The security domains may be generally referred to as a "high side," the domain encompassing heightened security requirements on data due to confidentiality, classification, and the like, and the "low side," the domain with lesser security restrictions. Also commonly referred to as a "cross domain solution."

"Bootstrapping" is intended to refer to the collective tasks associated with provisioning and deployment of any suitable number of resources (e.g., infrastructure components, artifacts, etc.) corresponding to a single service.

A "service" refers to functionality provided by a set of resources. A set of resources for a service includes any suitable combination of infrastructure, platform, or software (e.g., an application) hosted by a cloud provider that can be configured to provide the functionality of a service. A service can be made available to users through the Internet. For secure regions, services may only be accessible from within the target region.

An "artifact" refers to code being deployed to an infrastructure component or a Kubernetes engine cluster, this may include software (e.g., an application), configuration information (e.g., a configuration file) for an infrastructure component, or the like.

A "config" or "configuration" refers to a configuration file that describes a set of all resources (e.g., infrastructure components and artifacts) associated with a single service. A config may include declarative statements that specify one or more aspects corresponding to a desired state of the resources of the service.

"Service state" refers to a point-in-time snapshot of every resource (e.g., infrastructure resources, artifacts, etc.) associated with the service. The service state indicates status corresponding to provisioning and/or deployment tasks associated with service resources.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" after provisioning and deployment has concluded. Examples of resources may include, but are not limited to, virtual machines, databases, object storage, block storage, load balancers, and the like.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IP Sec Tunnel VPN). Certain essential core services (or "seed" services) like a deployment orchestrator, a public key infrastructure (PKI) service, and the like can be provisioned in a ViBE. These services can provide the capabilities required to bring the hardware online, establish a chain of trust to the new region, and deploy the remaining services in the new region. Utilising the virtual bootstrap environment can prevent circular dependencies between bootstrapping resources by utilising resources of the host region. Services can be staged and tested in the ViBE prior to the physical region (e.g., the target region) being available.

A "Deployment Service" may refer to a system configured to manage provisioning and deployment operations for any suitable number of services as part of a region build.

A "host region" refers to a region that hosts a virtual bootstrap environment (ViBE). A host region may be used to bootstrap a ViBE.

A "target region" refers to a region under build.

Bootstrapping a Region Using a CDS

In some examples, techniques for implementing a cross domain system (CDS) are described herein. Such techniques, as described briefly above, can be configured to allow a deployment system (e.g., a declarative infrastructure provisioning service) to manage bootstrapping (e.g., provisioning and deploying software to) infrastructure components within a secure cloud environment (e.g., a secure region). The CDS can include both hardware (e.g., computers, routers, switches, gateways, etc.) and software (e.g., filters, virtual data diodes, virtual networking devices, etc.) configured to permit secure, one-way paths of data (e.g., traffic, requests, software resources, etc.). The CDS can host a plurality of computing nodes that can be configured to perform one or more operations to support the functionality of the CDS. For example, the CDS may host a node that is configured as a data diode, which may enforce one-way flow of network traffic through the diode. As another example, the CDS may host a receiver node that is configured to receive traffic sent into the target region via the CDS and forward that traffic to the correct destination (e.g., a load balancer).

The CDS enables automated region build to occur for secure target regions while maintaining the security posture of the target region. The CDS may be configured to filter all data into the target region (e.g., deployed software resources) as well as all traffic out of the target region (e.g., requests for services hosted in a virtual bootstrap environment). The region build process uses a bootstrap environment to provide critical services for use by deployed services in the target region until the critical services are themselves deployed into the target region. Similarly, services in the bootstrap environment communicate with deployed services in the target region during bootstrapping. A conventional cross domain solution limits the two-way traffic between services as they are deployed from the bootstrap environment. The techniques described herein allow the CDS to support the bootstrapping process by permitting a deployment system and bootstrapping services to effectively send and receive data to and from the target region.

FIG. 1 is a block diagram and associated flow chart of an example process 101 for bootstrapping a target region 112 using a cross domain system (CDS) 118, according to at least one embodiment. The process 101 may generally describe operations for using a deployment system 114 in an orchestration region 108 to generate a bootstrapping environment 116 in a host region 110 and then deploy and/or provision software and/or infrastructure resources (e.g., target region infrastructure 120 at target region 112.

As discussed briefly above, the orchestration region 108, host region 110, and target region 112 may be examples of regions that include one or more data centers within a geographic area and configured to support customers having proximity to that geographic area. Target region 112 may be an example of a region with heightened security requirements, including isolation from external networks via CDS 118. Infrastructure of target region 112 may connect to a customer's secure internal network, but only have a connection to an external public network (e.g., the Internet) via CDS 118.

The CDS 118 may be configured as a one-way-transfer device. The CDS 118 may act as a protocol breaker to prevent bidirectional data transfer on the same channel. The CDS 118 may include one or more data diodes to enforce one-way traffic on a single channel. The CDS 118 may include one or more filters to filter traffic that is received through and/or sent out from the CDS 118. In some embodiments, the components of the CDS 118 may be implemented by any suitable combination of hardware and software to enforce one-way data transfer and traffic filtering. For example, a data diode may be implemented in hardware as an optical link that includes an optical transmitter (e.g., a laser, a light-emitting diode, etc.) and an optical receiver (e.g., a photosensitive transistor). Traffic (e.g., packets, frames, messages, etc.) received at a first terminal (e.g., optical transmitter) of the data diode may be sent to the second terminal (e.g., optical receiver) of the data diode, but traffic received at the second terminal cannot be sent to the first terminal. In some embodiments, data diodes may be implemented with software (e.g., virtual data diodes) and may be provided as a service (e.g., a cloud-based service). The CDS 118 can include an ingress channel and an egress channel that represent the one-way data pathways for traffic into and out from the target region 112, respectively. The ingress channel may represent a low-to-high channel (that is to say, a channel from a lower security domain to a higher security domain), while the egress channel may represent a high-to-low channel (a channel from a higher security domain to a lower security domain).

The deployment system 114 enables region building and world-wide infrastructure provisioning and code deployment with minimal manual run-time effort from service teams (e.g., beyond an initial approval and/or physical transportation of hardware, in some instances). The high-level responsibilities of the deployment system 114 include, but are not limited to, coordinating region builds in an automated fashion with minimal human intervention, providing users with a view of the current state of resources managed by the deployment system 114 (e.g., of a region, across regions, world-wide, etc.), and managing bootstrapping operations for bootstrapping resources within a region. Specific functionality of one example deployment system 114 is provided in more detail in U.S. application Ser. No. 17/016,754, entitled "Techniques for Deploying Infrastructure Resources with a Declarative Provisioning Tool," the entire contents of which are incorporated in their entirety for all purposes. In some embodiments, any suitable combination of the components of deployment system 114 may be provided as a service. As depicted, deployment system 114 may be deployed in orchestration region 108. In some embodiments, some portion of deployment system 114 may be deployed to another region (e.g., a data center represented by host region 110). In some embodiments, deployment system 114 may include any suitable number of cloud services (not depicted in FIG. 1) discussed in further detail in U.S. application Ser. No. 17/016,754.

The deployment system 114 is configured to provide any suitable number of user interfaces with which users may interact with deployment system 114. By way of example, users can make changes to region data via a user interface provided by deployment system 114. deployment system 114 may additionally provide a variety of interfaces that enable users to: view changes made to configs and/or artifacts, generate and view plans, approve/reject plans, view status on plan execution (e.g., corresponding to tasks involving infrastructure provisioning, deployment, region build, and/or desired state of any suitable number of resources managed by deployment system 114.

The process 101 may begin at block 102 with the deployment system 114 configuring resources for deployment. The configuration can include identifying resources for deployment, obtaining metadata about software (e.g., from a provenance ledger or similar service), obtaining packages for deployment (e.g., from a build system), and similar operations. In embodiments where deployment system 114 incorporates a declarative provisioning tool, configuration can include operations related to identifying one or more steps corresponding to an order of software changes (e.g., updated artifacts, updated configurations, etc.) to be performed to bring the deployed software to the desired state.

At block 104, the deployment system 114 can deploy software resources into a bootstrapping environment 116. The bootstrapping environment 116 may be hosted within host region 110. In some embodiments, bootstrapping environment 116 may be hosted with orchestration region 108. The bootstrapping environment can be a "seed server," which can include one or more computing devices providing hosting infrastructure for a minimum number of services needed for bootstrapping.

In some embodiments, the bootstrapping environment may be a virtual bootstrapping environment (ViBE). A ViBE can include a virtual cloud network (e.g., a network of cloud resources) implemented within a suitable region. The ViBE can have one or more nodes (e.g., compute nodes, storage nodes, load balancers, etc.) to support operations to host services deployed by deployment system 114. The ViBE services can in turn be used to support deployment of services into the target region 112. For example, deployment system 114 may deploy an instance of one or more constituent services of the deployment system 114 into the bootstrapping environment (e.g., a host region deployment service), which in turn may be used to deploy resources from the bootstrapping environment 116 to the target region 112. Because a ViBE is implemented as a virtual cloud network in an existing region (e.g., host region 110), any suitable amount of region infrastructure may be provisioned to support the deployed services within the ViBE (as compared to the fixed hardware resources of a seed server). The deployment system 114 may be configured to provision infrastructure resources (e.g., virtual machines, compute instances, storage, etc.) for the bootstrapping environment 116 in addition to deploying software resources to the bootstrapping environment.

When the target region is available to provide bootstrapping operations, the bootstrapping environment 116 can be connected to the target region so that services in the bootstrapping environment 116 can interact with the services and/or infrastructure components of the target region. This will enable deployment of production level services, instead of self-contained seed services as in previous systems, and will require connectivity over the internet to the target region. Conventionally, a seed service was deployed as part of a container collection and used to bootstrap dependencies necessary to build out the region. Using infrastructure/tooling of an existing region, resources may be bootstrapped (e.g., provisioned and deployed) into the bootstrapping environment 116 and connected to the service enclave of a region (e.g., host region 110) in order to provision hardware and deploy services until the target region (e.g., target region 112) is self-sufficient and can be communicated with directly. Utilizing the bootstrapping environment 116 allows for standing up the dependencies and services needed to be able to provision/prepare infrastructure and deploy software while making use of the host region's resources in order to break circular dependencies of core services.

At block 106, resources may be deployed from the bootstrapping environment 116 to the target region 112 via the CDS 118. The deployment of resources to the target region 112 may be orchestrated by deployment system 114 in conjunction with services (e.g., a host region deployment service) in the bootstrapping environment 116. This deployment can also include provisioning of target region infrastructure 120 suitable for hosting the deployed software. For example, any suitable number of virtual machines executing on a suitable number of computing devices (e.g., server racks) within one or more data centers of the target region 112 may be configured to host deployed software from the bootstrapping environment 116. All software artifacts deployed to the target region 112 pass through CDS 118 and are subjected to the filtering and security policies employed by CDS 118 to preserve the security and integrity of target region 112.

Figure 2:
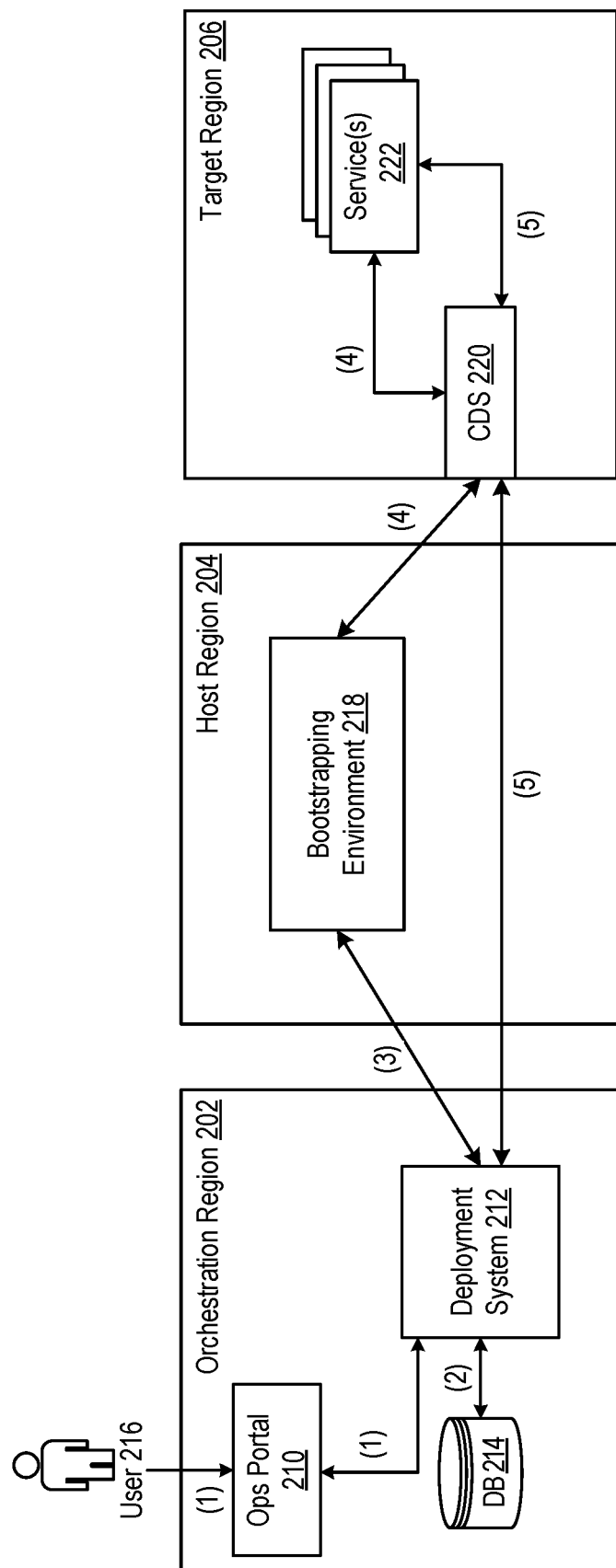
FIG. 2 is a block diagram for illustrating an environment and method for bootstrapping a target region using a deployment system and bootstrapping environment in regions connected to the target region, according to at least one embodiment.

FIG. 2 is a block diagram for illustrating an environment and method for bootstrapping a target region using a deployment system and bootstrapping environment in regions connected to the target region, according to at least one embodiment. Elements depicted in FIG. 2 may be similar to elements shown in FIG. 1. For example, orchestration region 202 may be similar to orchestration region 108 of FIG. 1, deployment system 212 may be similar to deployment system 114 of FIG. 1, and so on.

At step 1, a user (e.g., user 216) can request that a new region (e.g., target region 206) be built. The user 216 can access an ops portal 210 in orchestration region 202. The ops portal 210 may provide an interface for specifying the target region 206 and other parameters of the region build. The request to build the region may initiate region build operations from deployment system 212. In some embodiments, deployment system 212 may automatically perform tasks to bootstrap services (e.g., service(s) 222) in the target region 206, so that user 216 may only need to initiate the region build and monitor the build progress rather than provide specific configuration information for the build.

At step 2, the deployment system 212 can fetch software resources (e.g., artifacts, software images, configurations, packages etc.) and metadata about software to deploy from one or more databases or repositories (e.g., represented by database 214). The deployment system 212 may not obtain all metadata and/or software resources all at once prior to deploying software and provisioning infrastructure in a bootstrapping environment (e.g., bootstrapping environment 218). For example, deployment system 212 may first obtain necessary configuration information for deploying a first core service to the bootstrapping environment 218, deploy that first core service, then obtain additional configuration information for a second core service to be deployed to the bootstrapping environment 218 in a subsequent iteration of step 2.

At step 3, the deployment system 212 can establish the bootstrapping environment 218 in the host region 204 and/or deploy one or more core services to the bootstrapping environment 218. In some embodiments, the bootstrapping environment 218 may exist prior to the user 216 initiating the region build and may be used to bootstrap additional regions in conjunction with the build of target region 206. Establishing the bootstrapping environment 218 can include provisioning suitable infrastructure to host the one or more core services to be deployed into the bootstrapping environment 218. The deployment system 212 may make use of additional services within the orchestration region 202 and/or the host region 204 to implement the bootstrapping environment 218 or deploy core services thereto.

At step 4, the deployment system 212 can orchestrate the deployment of resources to the target region 206. The resources can include instances of services executing in the bootstrapping environment 218 (e.g., deploying service(s) 222). Resources deployed to the target region 206 pass through CDS 220 (an example of CDS 118 of FIG. 1). The CDS 220 can scan and filter the resources to check for data integrity and/or validity and verify that no malware or other unacceptable software is transmitted into the target region 206.

As part of step 4, resources deployed to the target region 206 can also include the configuration of the CDS 220 to support the region build process for the target region 206. For example, target region 206 may include a generic CDS that provides the filtering and one-way transfer restrictions described above. To support the region build process, the deployment system 212 and services in the bootstrapping environment may configure the CDS 220 to include a "sidecar" node that may be able to store some or all of the software resources (e.g., artifacts, images, configurations, etc.) at the CDS 220 after those resources have been filtered and pass through the one-way channel into the target region. Various configurations of the CDS 220 are possible according to several embodiments described in more detail below.

At step 5, as service(s) 222 are stood up in the target region 206, the service(s) 222 may communicate with services in the bootstrapping environment 218, the deployment system 212, or other services within the orchestration region 202 and/or host region 204. The service(s) 222 may transmit data (e.g., requests, messages, service traffic, etc.) out from the target region 206 via the CDS 220. CDS 220 may send the outgoing traffic through an egress channel that enforces one-way transfer of data out of the target region. The CDS 220 can also filter the outgoing traffic to check whether outgoing data is permitted to leave the secured target region 206 (e.g., check whether classified, confidential, or other restricted data is being sent by the service(s) 222). Similarly, the service(s) 222 may receive data into the target region 206 via an ingress channel of the CDS 220. Using the CDS 220 to modulate service traffic allows service(s) 222 to communicate with the bootstrapping environment 218 to support the bootstrapping operation.

As a specific example, in some embodiments a local deployment orchestration service may be deployed to the bootstrapping environment 218 that can manage tasks in conjunction with deployment system 212 to deploy services in the bootstrapping environment 218. To build target region 206, another instance of the local deployment orchestration service may be deployed into the target region 206. Once this target region deployment orchestration service is operational, the deployment system 212 may execute tasks in conjunction with the target region deployment orchestration service and not use the local deployment orchestration service in the bootstrapping environment.

CDS with Proxying Side Car

Figure 3:
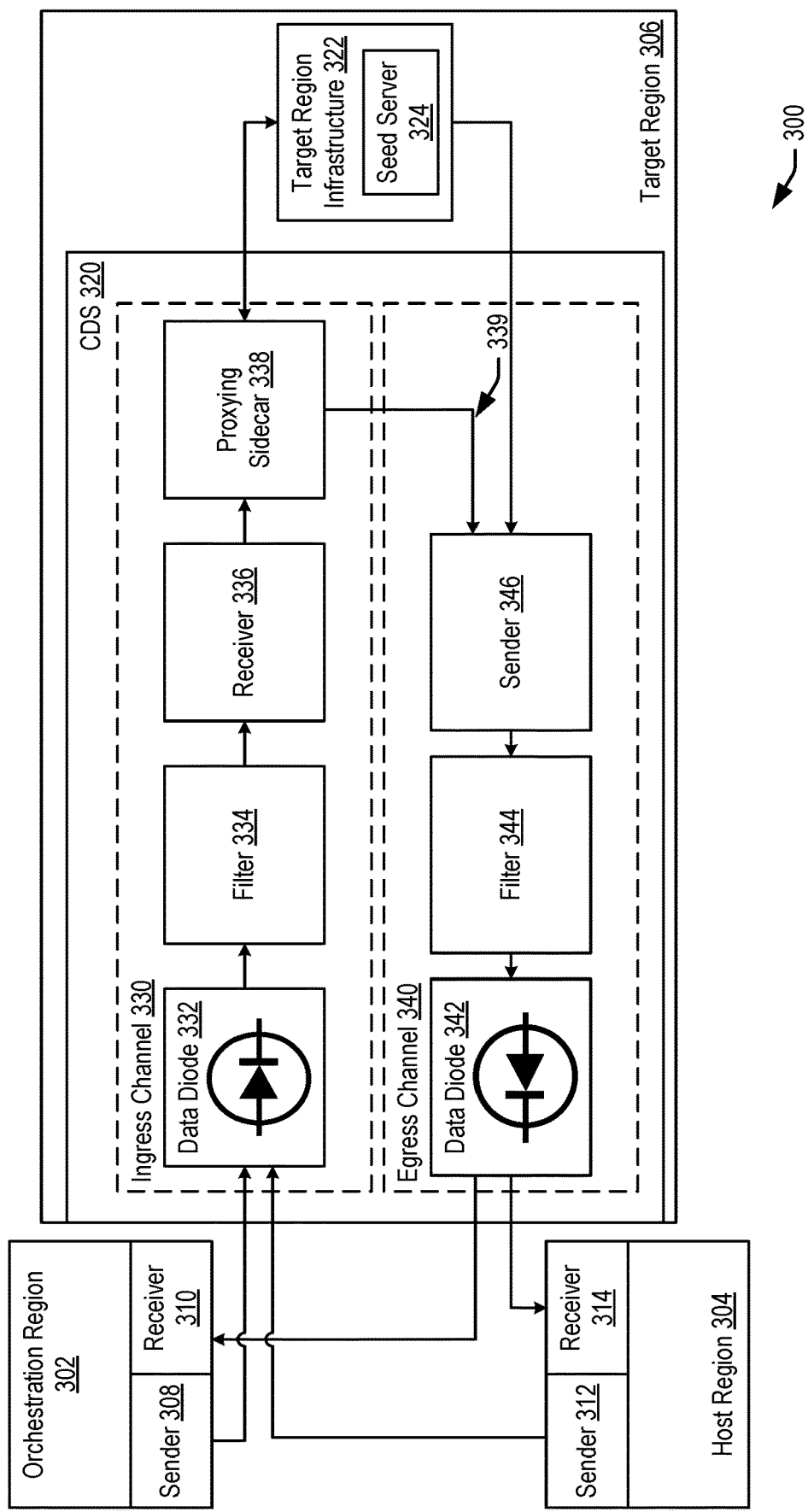
FIG. 3 is a block diagram depicting an example architecture for a cross domain system that includes a proxying sidecar for bootstrapping services to a target region, according to at least one embodiment.

FIG. 3 is a block diagram depicting an example architecture 300 for a cross domain system (CDS) 320 that includes a proxying sidecar 338 for bootstrapping services to a target region 306, according to at least one embodiment. The CDS 320 may be similar to other CDSs described herein, including CDS 220 of FIG. 2. The CDS 320 may be one or more computing devices and/or networking devices configured to perform the operations described herein with respect to enforcing one-way data transfer, filtering, traffic modulation, and traffic blocking/control. In some embodiments, CDS 320 may be implemented as part of a smart network interface card or similar device (e.g., bump in the wire). In some other embodiments, the CDS 320 may be implemented within other computing infrastructure of the target region 306 (e.g., as a service hosted on one or more computing devices of the target region 306).

The CDS 320 can include a plurality of nodes configured to perform one or more of the traffic control, filtering, or other tasks described herein for a CDS. CDS 320 can include data diodes 332, 342, filters 334, 344, a receiver node 336, a sender node 346, and a proxying sidecar 338. The data diode 332, filter 334, receiver node 336, and proxying sidecar 338 may constitute an ingress channel 330 that defines the data channel into the target region 306 via the CDS 320. Similarly, data diode 342, filter 344, and sender node 346 may constitute an egress channel 340 that defines the data channel out from the target region 306 via the CDS 320. Filter 334 may therefore be referred to as an ingress filter, while filter 344 may be referred to as an egress filter 344.

The data diodes 332, 342 may be similar components but oriented to support the appropriate one-way data pathway defined by the ingress channel 330 and egress channel 340. For example, data diode 332 may be an optical device configured to receive a data signal from outside the target region 306 (e.g., from sender 308 of orchestration region 302 or from sender 312 of host region 304), convert the data signal into an optical signal at one terminal of the data diode 332 (e.g., by an LED), transmit the optical signal to the second terminal of the data diode 332 (e.g., at a photosensitive transistor), convert the optical signal back into an electrical data signal, then send the data signal to the next node (e.g., filter 334) in the ingress channel 330. Data diode 342 may be a similar optical device but oriented to receive data signals from the egress channel 340 and send them out to receivers (e.g., receiver 310 of orchestration region 302 or receiver 314 of host region 304).

Although not depicted in FIG. 3, the data diodes 332, 342 can each include components configured as the input and output terminals of the diode. For example, each data diode 332, 342 can have a "pitcher" terminal and a "catcher" terminal. The pitcher terminal can be configured as the input terminal of the data diode, while the catcher terminal can be configured as the output terminal. Both pitcher and catcher terminals may be configured to apply content filtering to data payloads (e.g., packets, frames, messages, etc.) received/transmitted by the data diodes. In some embodiments, the pitcher and catcher terminals may also be configured to transform the data payloads into signals corresponding to the type of transfer mechanism enforced by the data diode (e.g., convert electrical signals to optical signals as described above for an optical diode).

Because the ingress channel 330 and the egress channel 340 of the CDS 320 define distinct data pathways, two-way traffic may not be permitted over the same channel. Services in external regions (e.g., deployment system 212 or services in bootstrapping environment 218 of FIG. 2) may expect two-way communication with services in the target region 306 to support the bootstrapping operation. To properly route traffic to and from the CDS 320, external regions can implement senders and receivers. Orchestration region 302 can implement sender 308 and receiver 310. Similarly, host region 304 can implement sender 312 and receiver 314. The senders and receivers may be gateways or similar networking devices (or combinations of suitable hardware and software devices to communicatively connect with a CDS). For example, sender 308 can be configured to route traffic from services in orchestration region 302 to the ingress channel 330 of CDS 320. Receiver 310 can be configured to receive traffic from the egress channel 340 of CDS 320 and route the traffic to the appropriate destination (e.g., service endpoint, computing node, etc.). Sender 312 and receiver 314 can be similarly configured to route traffic between CDS 320 and host region 304. In this way, services within the external regions can communicate with services within the target region during bootstrapping to support bootstrapping operations without being modified to account for the separate ingress and egress channels of the CDS.

The filter 334 in the ingress channel 330 may be configured to filter incoming data into the target region and enforce one or more security policies against the incoming data. For example, the filter 334 may scan traffic for known malicious software (e.g., malware, prohibited software, etc.) defined by a security policy. If the incoming data contains malicious software, the data may be blocked (e.g., dropped) by the filter. The filter 334 may be configured to selectively remove a portion of the data identified as malicious or otherwise in violation of a security policy and allow other data through (e.g., selectively blocking packets, frames, etc.). The filter 334 may also be configured to block incoming data received from unauthorized sources. For example, the target region 306 may be intended to be completely air-gapped during operation except for the external connection to the host region 304 and/or orchestration region 302 during bootstrapping. The filter 334 may be configured to only accept traffic originating from within the host region 304 and/or orchestration region 302.

The filter 344 in the egress channel 340 may be configured to filter outgoing data into the target region 306. Because the target region 306 may be designated as the higher security domain, the principal concern with content filtering on the egress channel 340 is preventing unauthorized exfiltration of data from target region 306 to lower security domains. The filter 344 may therefore be configured to enforce a security policy to prevent classified or other data from leaving the target region 306. The filter 344 may examine data (e.g., traffic, packets, messages, requests, etc.) passing through the egress channel 340 to determine if the data contains prohibited exfiltration data. If the filter 344 detects prohibited exfiltration data, it can block (e.g., drop) the traffic out instead of sending it to the data diode 342. Typical data leaving the target region 306 during a bootstrapping operation can include requests for software resources and telemetry data about the status of the bootstrapping operation.

The proxying sidecar 338 may be configured to support bootstrapping operations within the target region 306 by proxying requests from services in the target region 306 to request software resources on demand from the host region 304. The proxy requests may be sent to the egress channel 340 via pathway 339. The proxying sidecar 338 may have sufficient storage to store requested software resources (e.g., artifacts, configs, images, etc.) before providing those artifacts to the target region infrastructure 322. As an example, the bootstrapping operation may deploy a service (e.g., DNS service) to the target region infrastructure 322. After deploying, the service may require an updated configuration to be applied. The deployed service can request from the proxying sidecar 338 the updated configuration. If the updated configuration is stored at the proxying sidecar 338, the proxying sidecar 338 can vend the updated configuration to the service. If the updated configuration is not currently stored, the proxying sidecar 338 can send a request to the host region 304 or the orchestration region 302 (via pathway 339 and the egress channel 340) to obtain the configuration. The request may be received by an appropriate service that can send the updated configuration to the proxying sidecar 338 via the ingress channel 330, where it can then be vended to the deployed service. In this way, all data transferred into the target region 306 during bootstrapping is subject to the filtering from filter 334, while requests and other outbound traffic is filtered by filter 344 to prevent inadvertent loss of secure data.

Because the proxying sidecar 338 can request and obtain software resources on demand, it may use less storage capacity to maintain the requested files during bootstrapping. Eventually, the target region infrastructure 322 is provisioned to support the required core services to complete bootstrapping operations from within the target region 306 without relying on additional software transfers from the host region 304. As one example, the proxying sidecar 338 can be used to provision a seed server 324 in a similar manner as to how the bootstrapping environment in the host region (e.g., bootstrapping environment 218 of FIG. 2). The seed server 324 may store all required software resources to deploy production services at the target region 306. In some embodiments, the seed server 324 is instead a bootstrapping environment similar to the host region bootstrapping environment, such that the host region bootstrapping environment is used to provision a target region bootstrapping environment within the air-gapped target region 306. The target region bootstrapping environment can then provision the production services within the target region 306. When the target region environment has obtained all the necessary software resources from the external regions using the proxying sidecar 338, the proxying sidecar 338 may be removed from the CDS 320 or may be converted to a networking proxy for incoming traffic to the target region. If the proxying sidecar 338 is removed, the receiver 336 may be configured to route traffic to appropriate endpoints within the target region 306.

Figure 4:
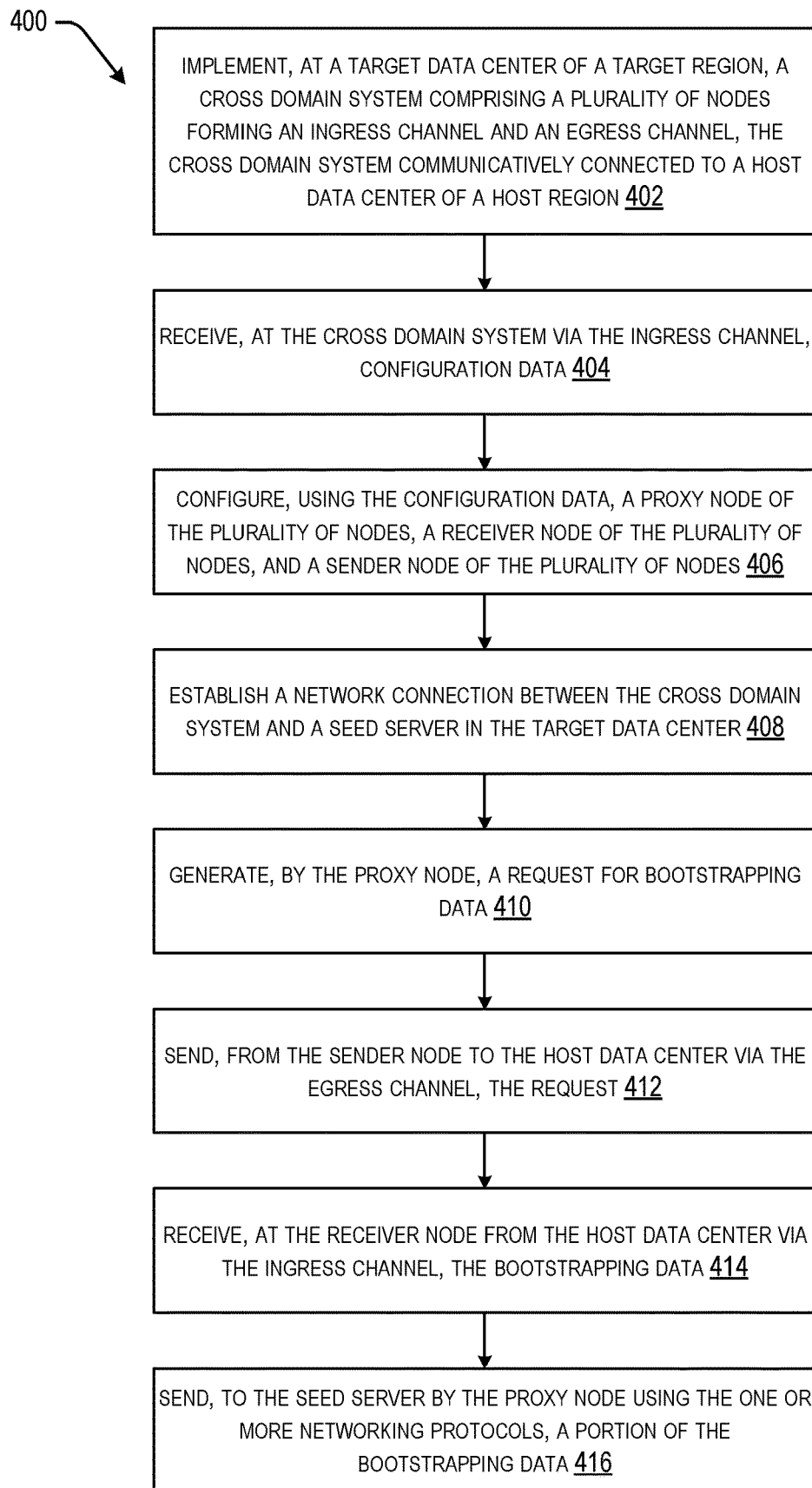
FIG. 4 is an example method for bootstrapping a region using a cross domain system that includes a proxying sidecar, according to at least one embodiment.

FIG. 4 is an example method 400 for bootstrapping a region using a cross domain system that includes a proxying sidecar, according to at least one embodiment. The method 400 may be performed by one or more components of a computing system, including one or more components of the CDS 320 of FIG. 3. A computer-readable storage medium comprising computer-readable instructions that, upon execution by one or more processors of a computing system, cause the computing system to perform the method 400. The operations of method 400 may be performed in any suitable order, and method 400 may include more or fewer operations than those depicted in FIG. 4.

Some or all of the method 400 (or any other processes and/or methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Method 400 may begin at block 402 by implementing a cross domain system (CDS) at a target data center of a target region. The CDS can be implemented as a suitable combination of hardware devices (e.g., computing, networking, storage) and software. The CDS may be a smart network interface card. The CDS can include a plurality of nodes that can form an ingress channel (e.g., ingress channel 330 of FIG. 3) and an egress channel (e.g., egress channel 340 of FIG. 3). The CDS may be communicatively connected to a host data center of a host region (e.g., host region 304 of FIG. 3). Implementing the CDS can include configuring one or more of the plurality of nodes to act as filters (e.g., filter 334, filter 344 of FIG. 3) to enforce one or more security policies to filter data passing into the target region via the ingress channel (e.g., to prevent malicious software or requests from unauthorized sources from entering the target region) and/or filter data passing out of the target region via the egress channel (e.g., to prevent classified or other secure data from leaving the target region).

At block 404, the CDS can receive configuration data via the ingress channel. The configuration data can include software resources to configure additional nodes of the CDS. The configuration data may be filtered in the ingress channel.

At block 406, the configuration data can be used to configure a proxy node (e.g., proxying sidecar 338 of FIG. 3), a receiver node (e.g., receiver 336 of FIG. 3), and a sender node (e.g., sender 346 of FIG. 3). The receiver node may be configured to route incoming traffic from the ingress channel to endpoints (e.g., services) in the target region or to the proxy node during bootstrapping. The proxy node may be communicatively connected to the receiver node (e.g., via pathway 339 of FIG. 3). The sender node may be configured to receive traffic from the target region and send it through the egress channel to destinations in external regions. The proxy node may be configured to proxy requests for software resources during bootstrapping operations to an appropriate external service and retrieve and store the requested resource. The stored resources may be vended on demand to services within the target region. The proxy node can provide one or more networking protocols for communications with components of the CDS, the target region, or external regions. In some embodiments, the one or more protocols can include a dynamic host control protocol and/or a file transfer protocol.

At block 408, a network connection can be established between the CDS and a seed server (e.g., seed server 324 of FIG. 3) in the target data center. In some embodiments, establishing the network connection may be based on the configuration data received at block 406. The seed server may be any suitable number of computing devices for hosting one or more core services used to provision production services during a bootstrapping process to build the target region. In certain embodiments, the seed server may instead be a bootstrapping environment within the target region, including a ViBE.

At block 410, the proxy node can generate a request for bootstrapping data. The bootstrapping data can be a software resource for a service being deployed in the target region. For example, the bootstrapping data may be an image (e.g., a software binary) for a constituent application of a service to be executed on a computing device in the target region. As another example, the bootstrapping data may be a configuration to update one or more parameters of a previously deployed service in the target region. The request generated by the proxy node may be in response to a request received at the proxy node from a service in the target region (e.g., a service partially deployed in the target region) or a service in an external region (e.g., the deployment system 212 of FIG. 2, a service in a bootstrapping environment 218 of FIG. 2, etc.).

At block 412, the request may be sent from the sender node to the host data center via the egress channel. The request may be filtered by an egress filter and passed through a one-way data diode (e.g., data diode 342 of FIG. 3). In response to the request, the receiver node may receive the requested bootstrapping data from the host data center, at block 414. The bootstrapping data may pass through an ingress channel data diode (e.g., data diode 332 of FIG. 3) and be filtered by an ingress filter (e.g., filter 334) before being received at the receiver node. In some embodiments, filtering the bootstrapping data can include determining whether the bootstrapping data contains prohibited data (e.g., prohibited based on one or more security policies). If the ingress filter determines that prohibited data is contained in the bootstrapping data, the ingress filter can remove the prohibited data prior to sending the bootstrapping data to the sender node. In some embodiments, the egress filter can filter the request by determining whether the request contains prohibited exfiltration data (e.g., defined by a security policy). If the egress filter determines that prohibited exfiltration data is contained in the request, then the egress filter may block the request and not send it out through the egress channel.

At block 416, the proxy node may send at least a portion of the bootstrapping data to the seed server. In some embodiments, the bootstrapping data includes multiple software images (e.g., software binaries) associated with one or more core services hosted in the host data center (e.g., core services that have been provisioned in the bootstrapping environment). The portion of the bootstrapping data can include a first software image of a first core service. The bootstrapping data can be sent using the one or more networking protocols. For example, the proxy node can send the software image using trivial file transfer protocol.

In some embodiments, the proxy node may be configured to store the bootstrapping data. The storage may be a storage device associated with the CDS, for example a disk drive, solid state drive, or the other suitable storage. The proxy node can receive a second request for a second portion of the bootstrapping data and, responsive to the request, send the second portion of the bootstrapping data (e.g., a second a software image) using the one or more networking protocols (e.g., file transfer protocol). The second portion of the bootstrapping data may be sent to the connected seed server or to another node within the target region.

In some embodiments, the bootstrapping of the target region can include services within the target region sending telemetry data from the target region out to an external region (e.g., orchestration region 302 of FIG. 3). The telemetry data can include information corresponding to the status of the bootstrapping operation. For example, a service deployed into the target region can send telemetry data indicating that it was successfully deployed. In some instances, services deployed into the target region may send telemetry data usable by a deployment system (e.g., deployment system 212 of FIG. 2) to orchestrate subsequent tasks for bootstrapping the target region. For example, once a service has been successfully deployed into the target region, the service can send telemetry data out from the target region (via the CDS) to a deployment system indicating the service is available in the target region. The deployment system can then deploy another service into the target region that depends on the first service being available in the target region. In some examples, the bootstrapping operation can include sending the bootstrapping data from the proxy node to the seed server. The telemetry data can then indicate whether the bootstrapping data was successfully delivered within the target region. In some embodiments, the telemetry data may be generated by the proxy node and/or the seed server. The telemetry data generated from the target region may be sent by the sender node out to the deployment system.

CDS with Static Side Car

Figure 5:
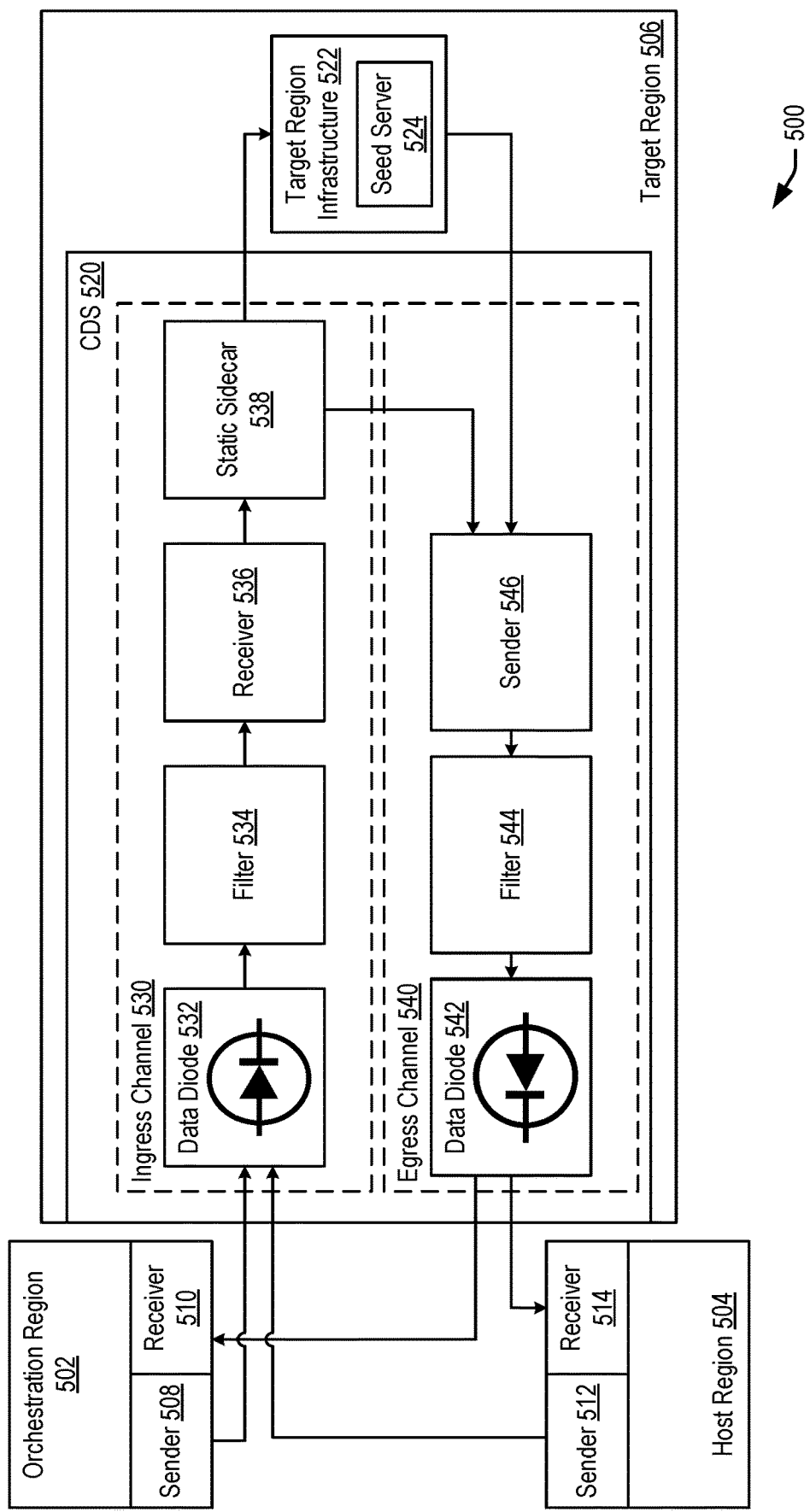
FIG. 5 is a block diagram depicting an example architecture for a cross domain system that includes a static sidecar for bootstrapping services to a target region, according to at least one embodiment.

FIG. 5 is a block diagram depicting an example architecture 500 for a cross domain system (CDS) 520 that includes a static sidecar 538 for bootstrapping services to a target region 506, according to at least one embodiment. The CDS 520 may be similar to other CDSs described herein, including CDS 220 of FIG. 2 and CDS 320 of FIG. 3. The CDS 520 may be one or more computing devices and/or networking devices configured to perform the operations described herein with respect to enforcing one-way data transfer, filtering, traffic modulation, and traffic blocking/control. As with CDS 320 described above with respect to FIG. 3, the CDS 520 can include a plurality of nodes that include data diodes 532, 542, filters 534, 544, a receiver node 536, a sender node 546. These components may be similar to the corresponding components of CDS 320 as described above. Similarly, the orchestration region 502, host region 504, senders 508, 512, and receivers 510, 514 may be examples of corresponding similarly named components described with respect to FIG. 3.

In this embodiment, the CDS 520 can include a static sidecar 538 (as compared to a proxying sidecar 338 of FIG. 3). The static sidecar 538 may be configured to support bootstrapping operations within the target region 506 by acting as a repository for the software resources sent to the target region from the bootstrapping environment (e.g., bootstrapping environment 218 of FIG. 2). For example, the static sidecar 538 may have sufficient storage to store artifacts (e.g., software images, configs, etc.) corresponding to all core services to be deployed to a seed server (e.g., seed server 524) in the target region 506. The static sidecar 538 has the advantage that all software for bootstrapping the seed server in the target region 506 may pass through the ingress channel 530 and related ingress filter 534 prior to bootstrapping operations beginning in the target region 506, reducing the number of requests for additional bootstrapping data sent out via the egress channel 540 (as in the case of a proxying sidecar).

As with the proxying sidecar 338, the static sidecar 338 can be used to provision a seed server 324 in a similar manner as to how the bootstrapping environment in the host region (e.g., bootstrapping environment 218 of FIG. 2). The seed server 524 may store all required software resources to deploy production services at the target region 306. In some embodiments, the seed server 524 is instead a bootstrapping environment similar to the host region bootstrapping environment, such that the host region bootstrapping environment is used to provision a target region bootstrapping environment within the air-gapped target region 506. The target region bootstrapping environment can then provision the production services within the target region 506. When the seed server 524 is provisioned (e.g., is executing the core services needed to complete provisioning of production services in the target region), the static sidecar 538 may be removed from the CDS 520 or may be converted to a networking proxy for incoming traffic to the target region. If the static sidecar 538 is removed, the receiver 536 may be configured to route traffic to appropriate endpoints within the target region 506.

Figure 6:
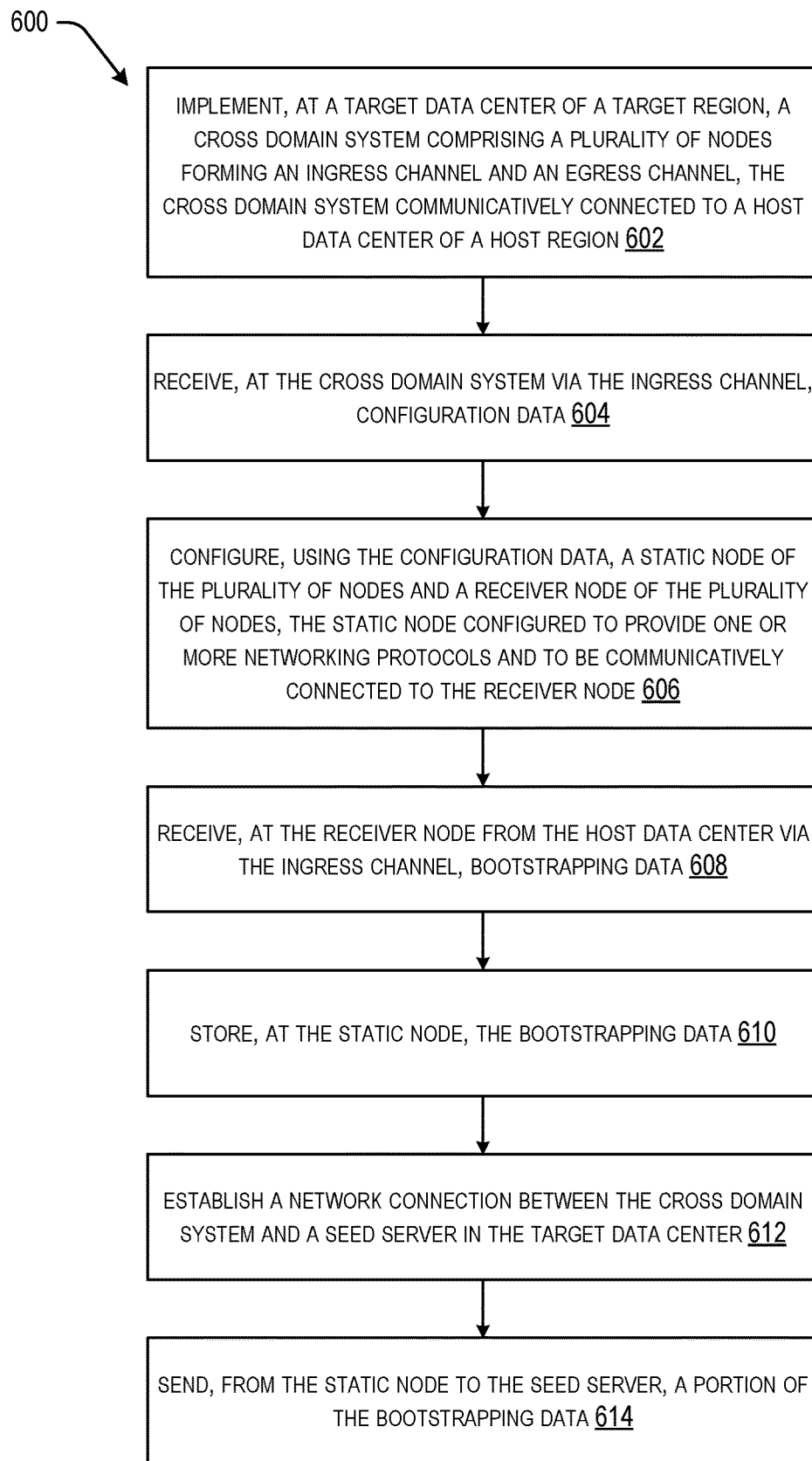
FIG. 6 is a is an example method for bootstrapping a region using a cross domain system that includes a static sidecar, according to at least one embodiment.

FIG. 6 is a is an example method 600 for bootstrapping a region using a cross domain system that includes a static sidecar, according to at least one embodiment. The method 600 may be performed by one or more components of a computing system, including one or more components of the CDS 520 of FIG. 5. A computer-readable storage medium comprising computer-readable instructions that, upon execution by one or more processors of a computing system, cause the computing system to perform the method 600. The operations of method 600 may be performed in any suitable order, and method 600 may include more or fewer operations than those depicted in FIG. 6.

The method 600 may begin at block 602 by implementing a cross domain system (CDS) at a target data center of a target region. The CDS can be implemented as a suitable combination of hardware devices (e.g., computing, networking, storage) and software. The CDS may be a smart network interface card. The CDS can include a plurality of nodes that can form an ingress channel (e.g., ingress channel 530 of FIG. 5) and an egress channel (e.g., egress channel 540 of FIG. 5). The CDS may be communicatively connected to a host data center of a host region (e.g., host region 504 of FIG. 5). Implementing the CDS can include configuring one or more of the plurality of nodes to act as filters (e.g., filter 534, filter 544 of FIG. 5) to enforce one or more security policies to filter data passing into the target region via the ingress channel (e.g., to prevent malicious software or requests from unauthorized sources from entering the target region) and/or filter data passing out of the target region via the egress channel (e.g., to prevent classified or other secure data from leaving the target region).

At block 604, the CDS can receive configuration data via the ingress channel. The configuration data can include software resources to configure additional nodes of the CDS. The configuration data may be filtered in the ingress channel.

At block 606, the configuration data can be used to configure a static node (e.g., static sidecar 538 of FIG. 5) and a receiver node (e.g., receiver 536 of FIG. 5). The receiver node may be configured to route incoming traffic from the ingress channel to endpoints (e.g., services) in the target region or to the static node during bootstrapping. The static node may be communicatively connected to the receiver node. The static node may be configured to receive and store software resources during bootstrapping operations. The stored resources may be vended on demand to services within the target region. The static node can provide one or more networking protocols for communications with components of the CDS, the target region, or external regions. In some embodiments, the one or more protocols can include a dynamic host control protocol and/or a file transfer protocol.

In some embodiments, the configuration data can be used to configure a sender node (e.g., sender 546 of FIG. 5). The sender node may be configured to receive traffic from the target region and send it through the egress channel to destinations in external regions. The sender node may be communicatively coupled to the static node. The sender node can be used to send telemetry data to the host data center. The telemetry data can be generated by the static node and/or the seed server. The telemetry data can include information corresponding to the status of the bootstrapping operation. For example, a service deployed into the target region can send telemetry data indicating that it was successfully deployed. In some instances, services deployed into the target region may send telemetry data usable by a deployment system (e.g., deployment system 212 of FIG. 2) to orchestrate subsequent tasks for bootstrapping the target region. For example, once a service has been successfully deployed into the target region, the service can send telemetry data out from the target region (via the CDS) to a deployment system indicating the service is available in the target region. The deployment system can then deploy another service into the target region that depends on the first service being available in the target region.

At block 608, the receiver node can receive bootstrapping data from the host data center via the ingress channel. The bootstrapping data can be a software resource for a service to be deployed in the target region. For example, the bootstrapping data may be an image (e.g., a software binary) for a constituent application of a service to be executed on a computing device in the target region. As another example, the bootstrapping data may be a configuration to update one or more parameters of a previously deployed service in the target region. The bootstrapping data can include software images of core services hosted in the host data center. In some embodiments, the bootstrapping data can include all of the software resources needed to provision and deploy a seed server (e.g., seed server 524 of FIG. 5). The bootstrapping data can be stored at the static node, at block 610.

At block 612, a network connection can be established between the CDS and a seed server (e.g., seed server 524 of FIG. 3) in the target data center. The seed server may be any suitable number of computing devices (e.g., one or two servers, more than two servers, etc.) for hosting one or more core services used to provision production services during a bootstrapping process to build the target region. In certain embodiments, the seed server may instead be a bootstrapping environment within the target region, including a ViBE.

At block 614, the static node can send a portion of the bootstrapping data to the seed server. In some embodiments, the static node can perform a bootstrapping operation on the seed server. The bootstrapping operation can include configuring the seed server using the portion of the bootstrapping data. For example, the portion of the bootstrapping operation can include an operating system image to be installed on the seed server to provision the seed server to host one or more applications of a core service. The bootstrapping operation can also include sending a second portion of the bootstrapping data stored at the static node to the seed server and using the second portion to further configure the seed server. For example, the second portion of the bootstrapping data can include a software image of an application of a core service for execution on the provisioned seed server. As part of the bootstrapping operation, the seed server can send an indication to the static node that the deployment of the software corresponding to the first portion and/or the second portion of the bootstrapping data is complete.

In some embodiments, the bootstrapping data received by the static node via the ingress channel may be filtered by the ingress filter. Filtering the bootstrapping data can include determining whether the bootstrapping data contains prohibited data (e.g., prohibited based on one or more security policies). If the ingress filter determines that prohibited data is contained in the bootstrapping data, the ingress filter can remove the prohibited data prior to sending the bootstrapping data to the sender node. In some embodiments, the telemetry data sent out via the egress channel may be filtered by the egress filter. The egress filter can filter the telemetry data by determining whether the telemetry data contains prohibited exfiltration data (e.g., defined by a security policy). If the egress filter determines that prohibited exfiltration data is contained in the telemetry data, then the egress filter may block the telemetry data and not send the telemetry data out through the egress channel.

CDS with Edge Cluster Configurator

Figure 7:
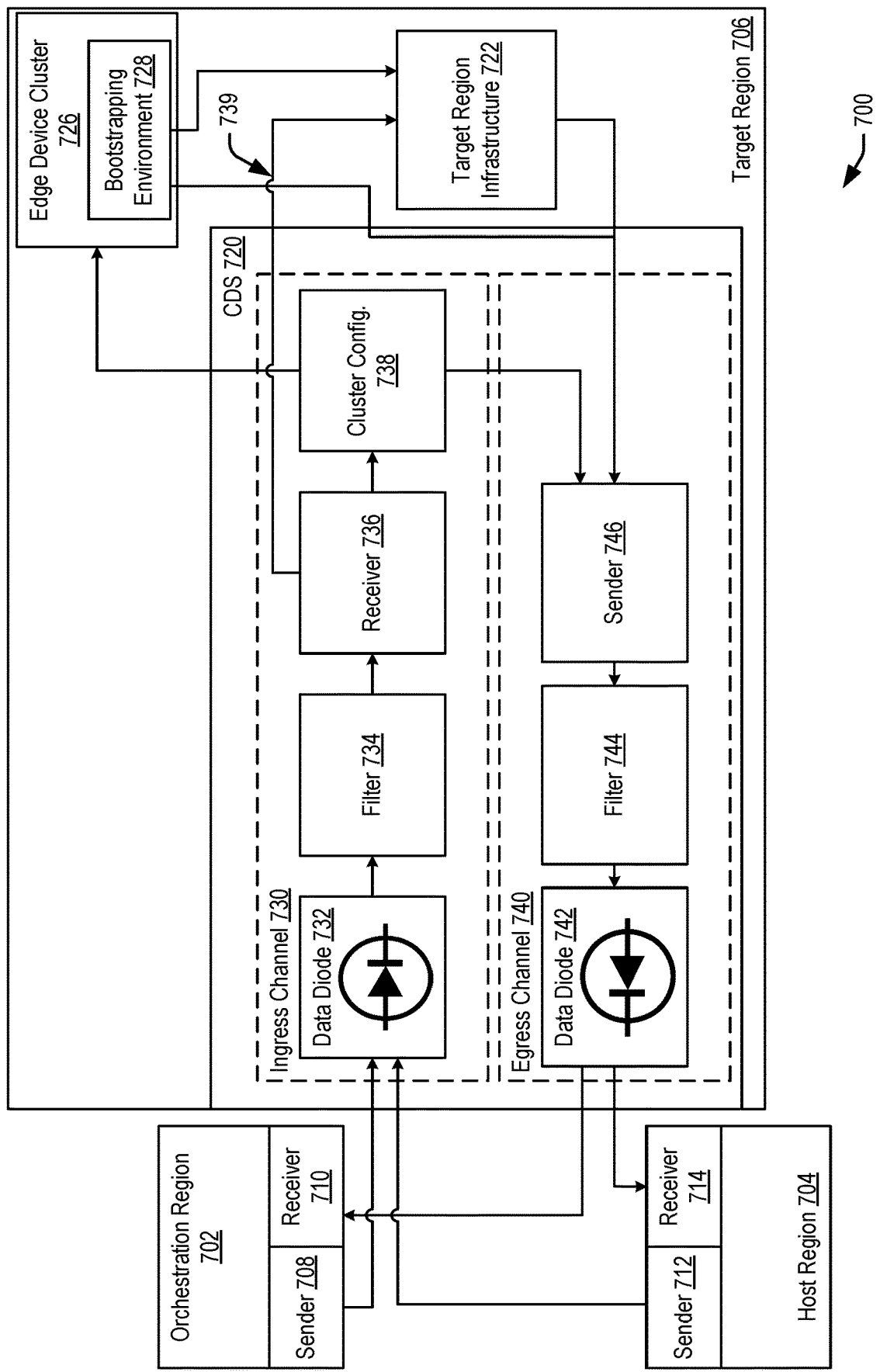
FIG. 7 is another block diagram depicting an example architecture for a cross domain system that can configure an edge device cluster to host a bootstrapping environment, according to at least one embodiment.

FIG. 7 is another block diagram depicting an example architecture 700 for a cross domain system 720 that can configure an edge device cluster 726 to host a bootstrapping environment 728, according to at least one embodiment. The CDS 720 may be similar to other CDSs described herein, including CDS 220 of FIG. 2, CDS 320 of FIG. 3, and CDS 520 of FIG. 5. The CDS 520 may be one or more computing devices and/or networking devices configured to perform the operations described herein with respect to enforcing one-way data transfer, filtering, traffic modulation, and traffic blocking/control. As with CDS 320 described above with respect to FIG. 3, the CDS 720 can include a plurality of nodes that include data diodes 732, 742, filters 734, 744, a receiver node 736, and a sender node 746. These components may be similar to the corresponding components of CDS 320 as described above. Similarly, the orchestration region 702, host region 704, senders 708, 712, and receivers 710, 714 may be examples of corresponding similarly named components described with respect to FIGS. 3 and 5.

Instead of provisioning a seed server in the target region 706, the CDS 720 can be configured to provision the edge device cluster 726. The edge device cluster 726 may be a cluster of edge computing devices (e.g., a portable fleet of server nodes) capable of providing cloud-computing infrastructure at a location at an "edge" of an existing network. For example, a target region data center of target region 706 may be connected to the edge device cluster 726 at a periphery of the data center network. The edge device cluster 726 can include computing hardware to support virtual machines (VMs), containers, functions and data files, block volumes, or object storage service. Additionally, the edge device cluster 726 may be configured to implement both a control plane and a data plane that are part of a cloud infrastructure service provider. The data plane can be configured to manage data storage, migration, processing, etc., while the control plan can be configured for controlling the various services and architecture components of the computing device. Once the edge device cluster 726 is properly connected to a customer computing device (e.g., via a local area network (LAN)), the customer may be able to utilize the IaaS service (or at least a subset of it) using the same SDK and API used with a centralized cloud service.

The edge device cluster 726 can be delivered to the target region 706 in a pre-configured form, such that the only action that might be required of the customer is to connect the nodes to a network (e.g., a local/on premises network that is accessible by a user computing device), power them up, and/or log in. The edge device cluster 726 can be pre-configured to support region build operations, including building secure, air-gapped regions like target region 706.

An edge device in the edge device cluster 726 can include object and/or block storage for storing local data. The edge device includes an operating system (OS). optimized for executing on an edge device and/or specific to execution on an edge device. The OS may be configured to manage the hardware of the edge device and supports a data plane of one or more services running on the edge device. The OS may be configured to support a specific deployment type (e.g., deployment into an air-gapped target data center). The OS may be configured to secure the edge device by disallowing direct access by customers.

In some embodiments, the edge device may include hardware such as any suitable number of central processing units (CPUs) and/or storage drives. For example, the edge device may have one, two, or more CPUs, with various numbers of cores per processing unit, and it may include any number of storage drives (e.g., 6.4 terabyte (TB) drives, or the like). As a non-limiting example, the edge device may include block and/or object storage of any suitable size. The edge device may include any suitable number of central processing units (CPUs), graphics processing units (GPUs), random access memory (RAM) of any suitable size, one or more ports (e.g., QSFP28, RJ45, dual ports, etc.), tamper-evident seals, or any suitable combination of the above components. The edge device cluster 726 can include one, two, five, or more edge devices to form the cluster. Specific details of example edge device clusters can be found in U.S. patent application Ser. No. 17/549,859, entitled "Techniques for Secure Intra-Node Communication Between Edge Device," the entire contents of which are herein incorporated by reference for all purposes.

In this embodiment, the CDS 720 can include a cluster configuration node 738. The cluster configuration node 738 may be configured to configure the edge device cluster 726 and provision the bootstrapping environment 728. The bootstrapping environment 728 may be similar to bootstrapping environment 218 of FIG. 2. Because the edge device cluster 726 may have sufficient computing resources to replicate cloud service infrastructure within the cluster, the bootstrapping environment 728 may be less constrained than a seed server. The bootstrapping environment 728 may be a ViBE. The cluster configuration node 738 may have storage to store artifacts (e.g., software images, configs, etc.) corresponding to core services hosted within the bootstrapping environment of the host region 704. The cluster configuration node 738 can receive software resources from the host region 704 and bootstrap the bootstrapping environment (e.g., a ViBE) on the edge device cluster 726, which can in turn be used to bootstrap production services hosted in target region infrastructure 722. The edge device cluster 726 can be connected to the sender node 746 in order to communicate with the host region 704 or orchestration region 702 during bootstrapping operations (e.g., to send telemetry data). The receiver node 736 of CDS 720 can be connected to the target region infrastructure 722 to communicate with services as they are stood up from the bootstrapping environment 728, so that communications from the external regions are not routed through the edge device cluster 726 unnecessarily.

Figure 8:
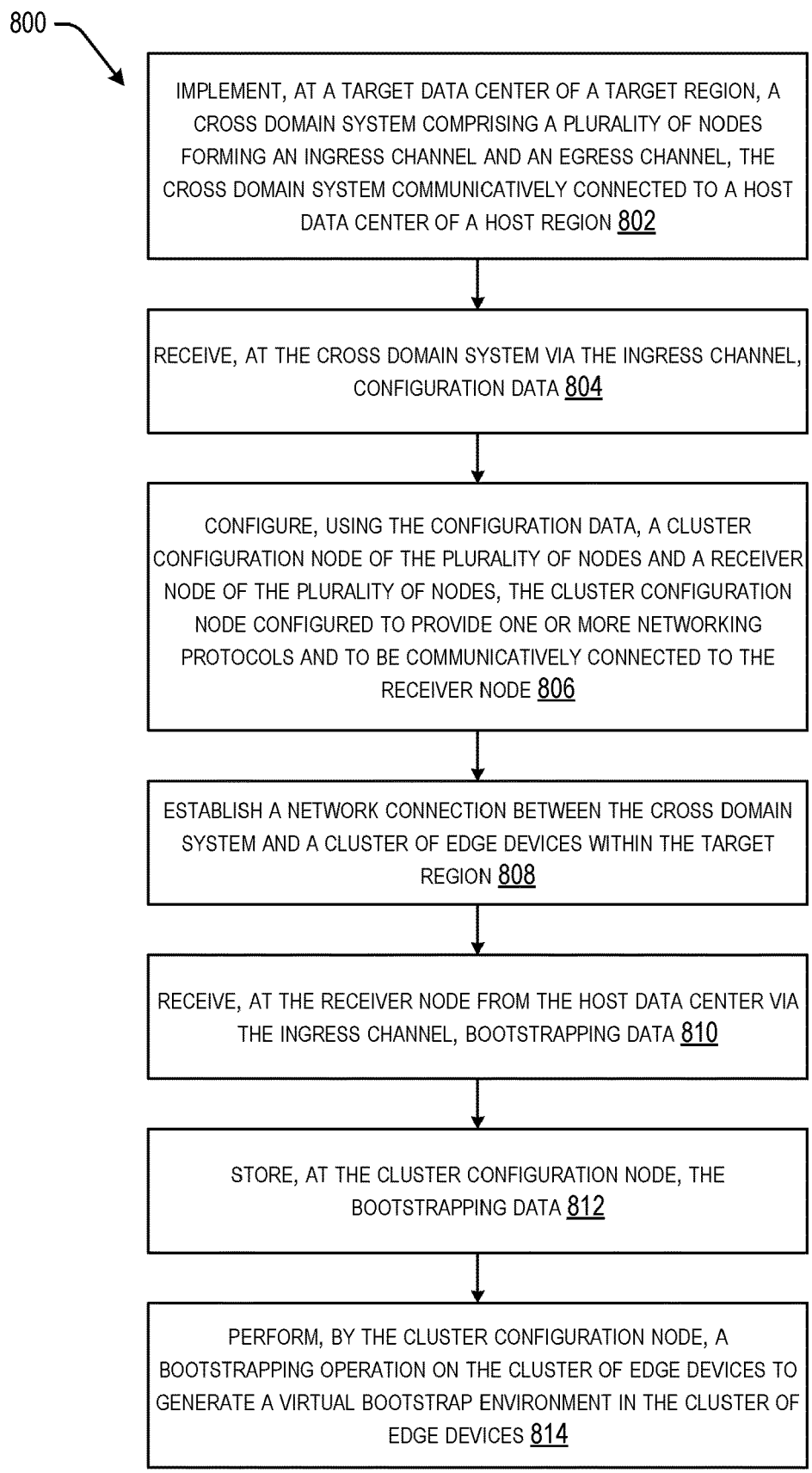
FIG. 8 illustrates an example method for bootstrapping a region using a cross domain system and an edge device cluster, according to at least one embodiment.

FIG. 8 illustrates an example method for bootstrapping a region using a cross domain system and an edge device cluster, according to at least one embodiment. The method 800 may be performed by one or more components of a computing system, including one or more components of the CDS 720 of FIG. 7. A computer-readable storage medium comprising computer-readable instructions that, upon execution by one or more processors of a computing system, cause the computing system to perform the method 800. The operations of method 800 may be performed in any suitable order, and method 800 may include more or fewer operations than those depicted in FIG. 8.

The method 800 may begin at block 802 by implementing a cross domain system (CDS) at a target data center of a target region. The CDS can be implemented as a suitable combination of hardware devices (e.g., computing, networking, storage) and software. The CDS may be a smart network interface card. The CDS can include a plurality of nodes that can form an ingress channel (e.g., ingress channel 730 of FIG. 7) and an egress channel (e.g., egress channel 740 of FIG. 7). The CDS may be communicatively connected to a host data center of a host region (e.g., host region 704 of FIG. 7). Implementing the CDS can include configuring one or more of the plurality of nodes to act as filters (e.g., filter 734, filter 744 of FIG. 7) to enforce one or more security policies to filter data passing into the target region via the ingress channel (e.g., to prevent malicious software or requests from unauthorized sources from entering the target region) and/or filter data passing out of the target region via the egress channel (e.g., to prevent classified or other secure data from leaving the target region).

At block 804, the CDS can receive configuration data via the ingress channel. The configuration data can include software resources to configure additional nodes of the CDS. The configuration data may be filtered in the ingress channel.

At block 806, the configuration data can be used to configure a cluster configuration node (e.g., cluster configuration node 738 of FIG. 7) and a receiver node (e.g., receiver 736 of FIG. 7). The receiver node may be configured to route incoming traffic from the ingress channel to endpoints (e.g., services) in the target region or to the cluster configuration node during bootstrapping. The cluster configuration node may be communicatively connected to the receiver node. The cluster configuration node may be configured to receive and store software resources during bootstrapping operations. The stored resources may be vended to services within a bootstrapping environment within a edge device cluster. The cluster configuration node can provide one or more networking protocols for communications with components of the CDS, the target region, or external regions. In some embodiments, the one or more protocols can include a dynamic host control protocol and/or a trivial file transfer protocol.

In some embodiments, the configuration data can also be used to configure a sender node of the CDS. The sender node may be configured to send traffic through the egress channel to external regions (e.g., the host region 704, the orchestration region 702 of FIG. 7). The sender node may be communicatively connected to the cluster configuration node. The sender node can be used to send telemetry data to the host data center. The telemetry data can be generated by the cluster configuration node and/or the cluster of edge devices. The telemetry data can include information corresponding to the status of the bootstrapping operation. For example, a service deployed into the target region can send telemetry data indicating that it was successfully deployed. In some instances, services deployed into the target region may send telemetry data usable by a deployment system (e.g., deployment system 212 of FIG. 2) to orchestrate subsequent tasks for bootstrapping the target region. For example, once a service has been successfully deployed into the target region, the service can send telemetry data out from the target region (via the CDS) to a deployment system indicating the service is available in the target region. The deployment system can then deploy another service into the target region that depends on the first service being available in the target region.

At block 808, a network connection may be established between the CDS and a cluster of edge devices (e.g., edge device cluster 726) within the target region. The cluster of edge devices may be connected to the target region data center network. The cluster of edge devices may be configured to host one or more core services used to provision production services during a bootstrapping process to build the target region. The bootstrapping environment may be a ViBE.

At block 810, the receiver node of the CDS can receive bootstrapping data from the host data center via the ingress channel. For example, the bootstrapping data may be an image (e.g., a software binary) for a constituent application of a service to be executed on a computing device in the target region. As another example, the bootstrapping data may be a configuration to update one or more parameters of a previously deployed service in the target region. The bootstrapping data can include software images of core services hosted in the host data center. In some embodiments, the bootstrapping data can include all of the software resources needed to provision and deploy the bootstrapping environment on the cluster of edge devices. The bootstrapping data can be stored at the cluster configuration node, at block 812.

At block 814, the cluster configuration node can perform a bootstrapping operation on the cluster of edge computing devices to generate a ViBE in the cluster. The bootstrapping operation can include provisioning infrastructure resources of the cluster of edge devices to support the ViBE. In some embodiments, the bootstrapping operation can include deploying a service to the cluster of edge devices. The bootstrapping operation can use the bootstrapping data stored at the cluster configuration node. For example, the bootstrapping data may be a software image for a service to be deployed in the ViBE. The cluster configuration node can send the image to the ViBE to deploy the application as part of the service.

In some embodiments, the cluster configuration node can act similarly to a proxying node and proxy requests received from the cluster of edge devices to obtain additional bootstrapping data from the host region. The cluster configuration node can receive a request from the cluster of edge devices and send the request to the host data center via the egress channel. Responsive to the request, the receiver node of the CDS may subsequently receive the requested additional bootstrapping data via the ingress channel, which can be sent to the cluster of edge devices by the cluster configuration node.

In some embodiments, the cluster configuration node can receive an indication that the target data center has been successfully bootstrapped by the cluster of edge devices. For example, after all production services have been stood up in the target region, the cluster of edge devices can send an indication that bootstrapping is complete. Responsive to the indication, an additional networking connection (e.g., pathway 739 of FIG. 7) between the receiver node and the target data center. The additional networking connection may be used by the receiver node to route traffic to target region endpoints (e.g., services in the production region) after bootstrapping operations are complete.

In some embodiments, the bootstrapping data received by the static node via the ingress channel may be filtered by the ingress filter. Filtering the bootstrapping data can include determining whether the bootstrapping data contains prohibited data (e.g., prohibited based on one or more security policies). If the ingress filter determines that prohibited data is contained in the bootstrapping data, the ingress filter can remove the prohibited data prior to sending the bootstrapping data to the sender node. In some embodiments, the request sent out via the egress channel may be filtered by the egress filter. The egress filter can filter the request by determining whether the request contains prohibited exfiltration data (e.g., defined by a security policy). If the egress filter determines that prohibited exfiltration data is contained in the request, then the egress filter may block the request and not send the telemetry data out through the egress channel.

Example Architectures for Providing Infrastructure-as-a-Service (IaaS)

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model may require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to first be setup. In some instances, the provisioning can be done manually, a provisioning tool may be utilized to provision the resources, and/or deployment tools may be utilized to deploy the code once the infrastructure is provisioned.

Figure 9:
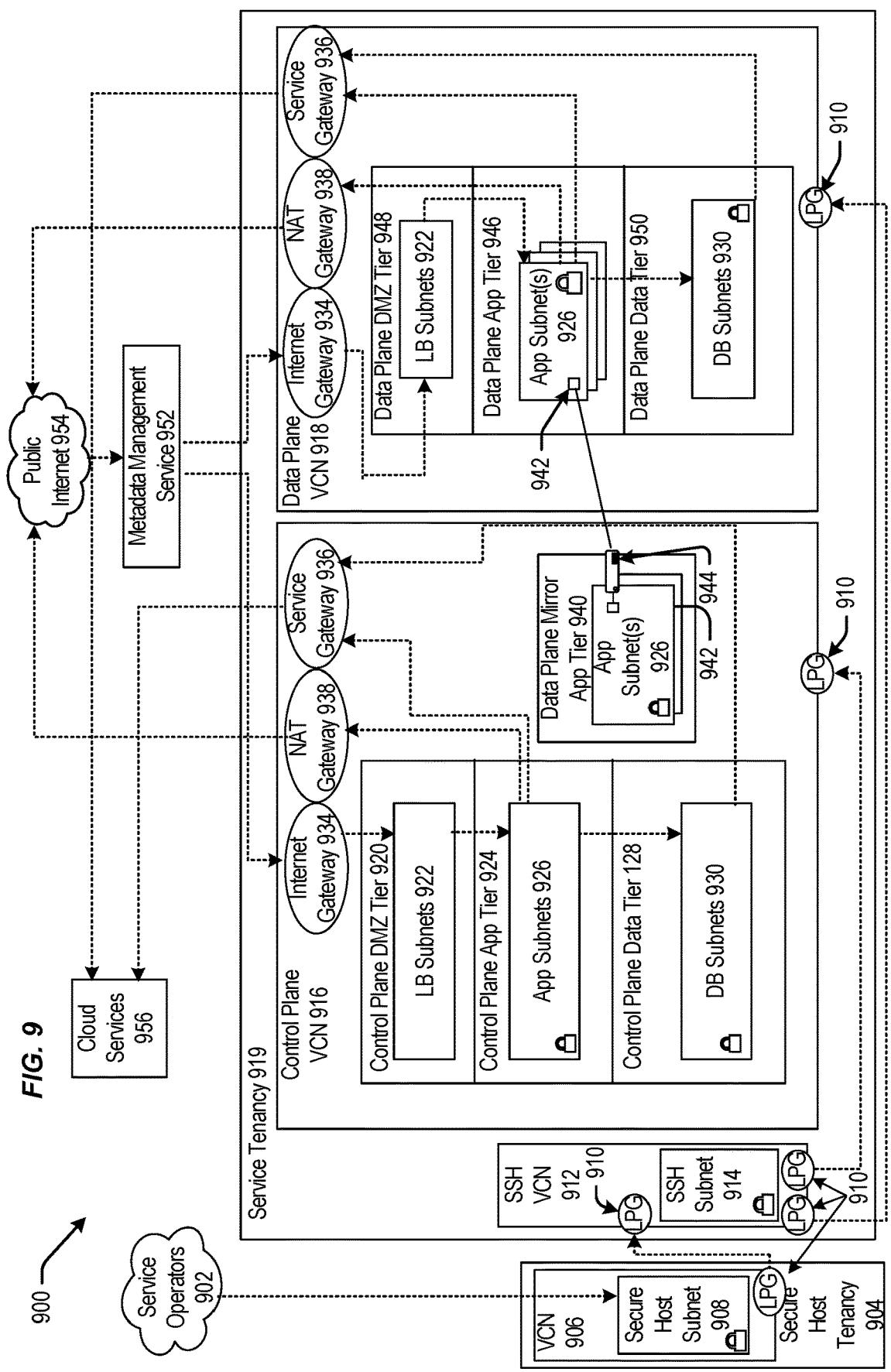
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Memory that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
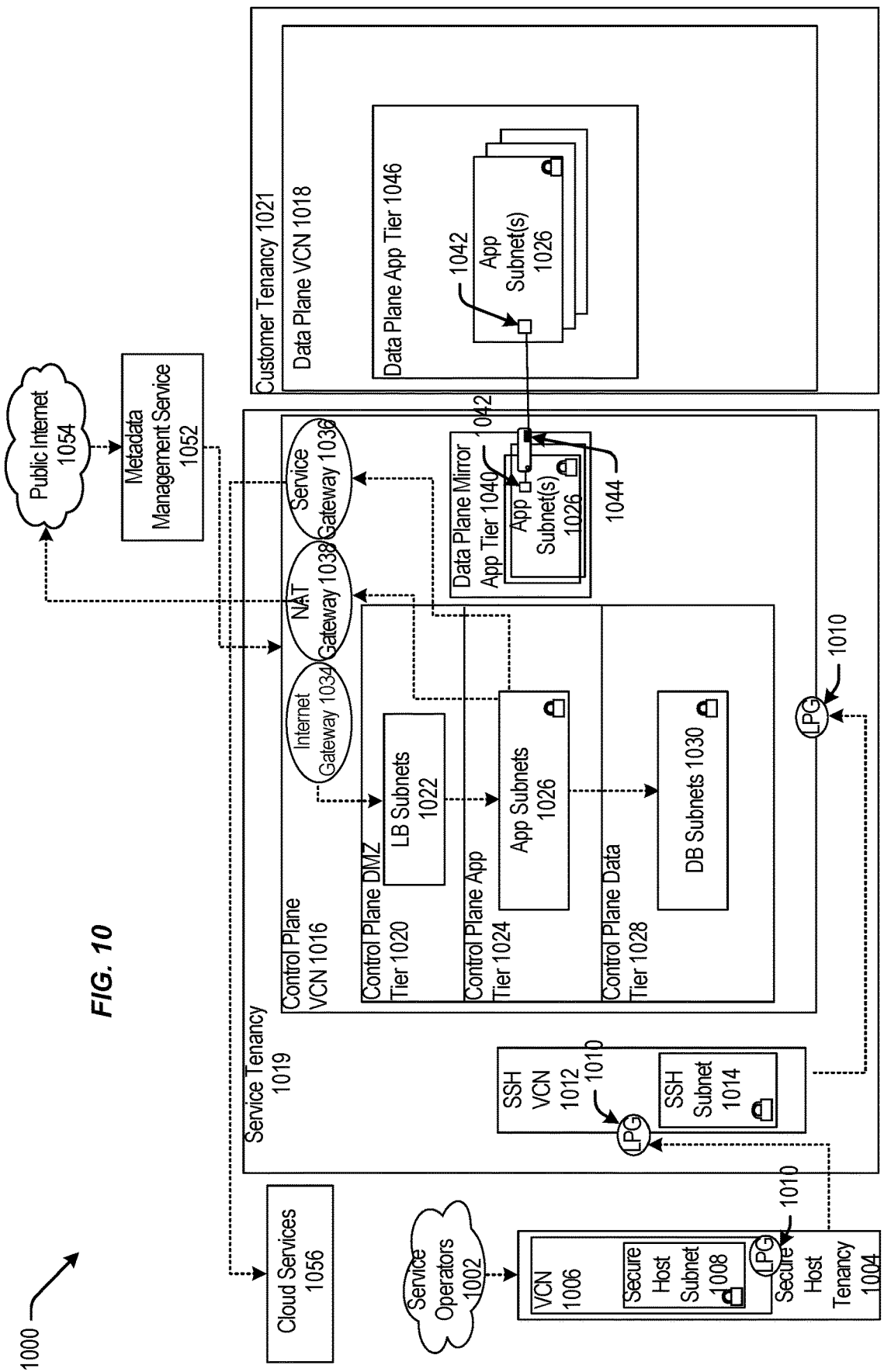
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 902 of FIG. 9) can be communicatively coupled to a secure host tenancy 1004 (e.g. the secure host tenancy 904 of FIG. 9) that can include a virtual cloud network (VCN) 1006 (e.g. the VCN 906 of FIG. 9) and a secure host subnet 1008 (e.g. the secure host subnet 908 of FIG. 9). The VCN 1006 can include a local peering gateway (LPG) 1010 (e.g. the LPG 910 of FIG. 9) that can be communicatively coupled to a secure shell (SSH) VCN 1012 (e.g. the SSH VCN 912 of FIG. 9) via an LPG 910 contained in the SSH VCN 1012. The SSH VCN 1012 can include an SSH subnet 1014 (e.g. the SSH subnet 914 of FIG. 9), and the SSH VCN 1012 can be communicatively coupled to a control plane VCN 1016 (e.g. the control plane VCN 916 of FIG. 9) via an LPG 1010 contained in the control plane VCN 1016. The control plane VCN 1016 can be contained in a service tenancy 1019 (e.g. the service tenancy 919 of FIG. 9), and the data plane VCN 1018 (e.g. the data plane VCN 918 of FIG. 9) can be contained in a customer tenancy 1021 that may be owned or operated by users, or customers, of the system.

The control plane VCN 1016 can include a control plane DMZ tier 1020 (e.g. the control plane DMZ tier 920 of FIG. 9) that can include LB subnet(s) 1022 (e.g. LB subnet(s) 922 of FIG. 9), a control plane app tier 1024 (e.g. the control plane app tier 924 of FIG. 9) that can include app subnet(s) 1026 (e.g. app subnet(s) 926 of FIG. 9), a control plane data tier 1028 (e.g. the control plane data tier 928 of FIG. 9) that can include database (DB) subnet(s) 1030 (e.g. similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g. the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g. the service gateway of FIG. 9) and a network address translation (NAT) gateway 1038 (e.g. the NAT gateway 938 of FIG. 9). The control plane VCN 1016 can include the service gateway 1036 and the NAT gateway 1038.

The control plane VCN 1016 can include a data plane mirror app tier 1040 (e.g. the data plane mirror app tier 940 of FIG. 9) that can include app subnet(s) 1026. The app subnet(s) 1026 contained in the data plane mirror app tier 1040 can include a virtual network interface controller (VNIC) 1042 (e.g. the VNIC of 942) that can execute a compute instance 1044 (e.g. similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g. the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g. the metadata management service 952 of FIG. 9) that can be communicatively coupled to public Internet 1054 (e.g. public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g. cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
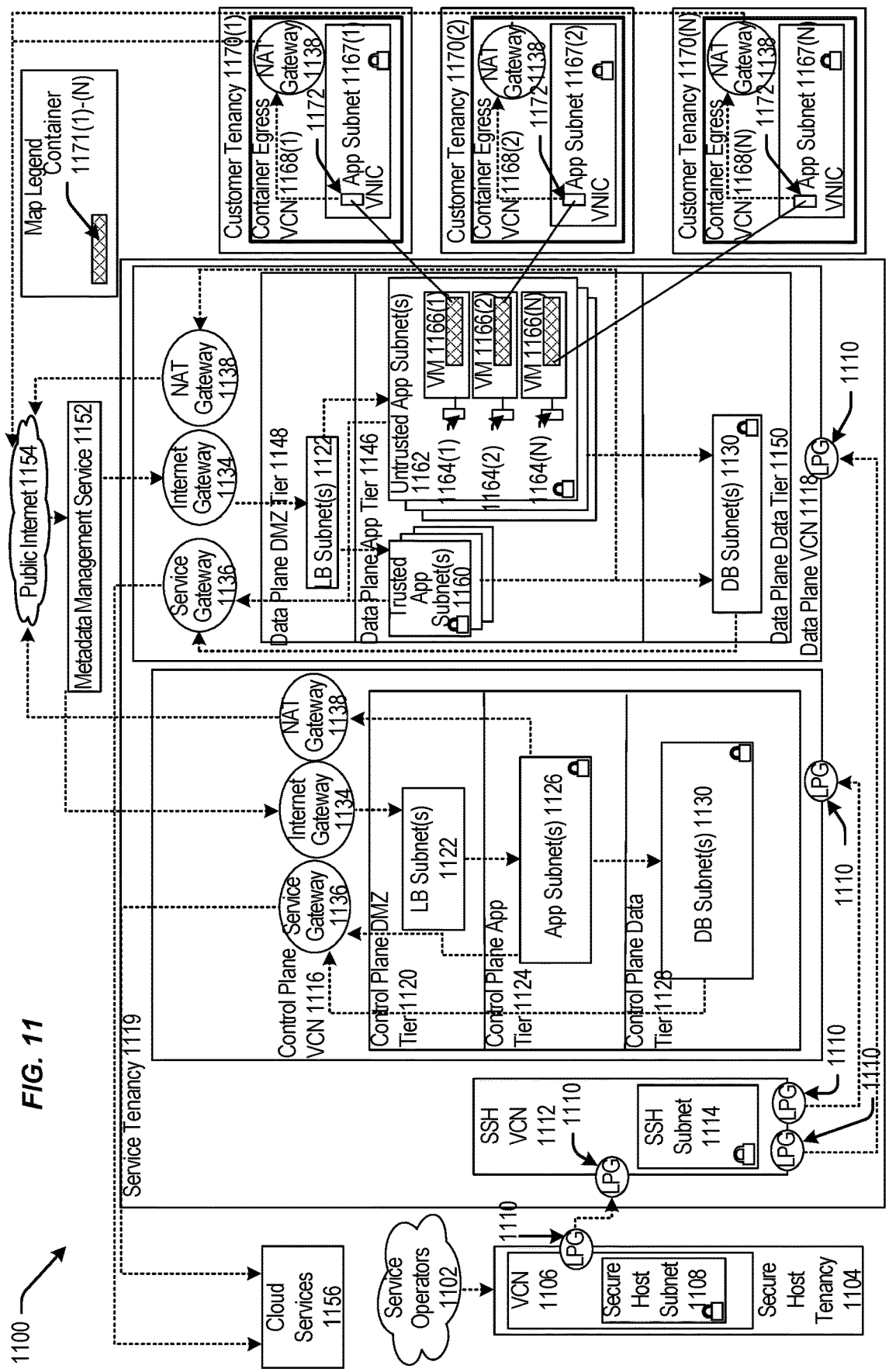
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 902 of FIG. 9) can be communicatively coupled to a secure host tenancy 1104 (e.g. the secure host tenancy 904 of FIG. 9) that can include a virtual cloud network (VCN) 1106 (e.g. the VCN 906 of FIG. 9) and a secure host subnet 1108 (e.g. the secure host subnet 908 of FIG. 9). The VCN 1106 can include an LPG 1110 (e.g. the LPG 910 of FIG. 9) that can be communicatively coupled to an SSH VCN 1112 (e.g. the SSH VCN 912 of FIG. 9) via an LPG 1110 contained in the SSH VCN 1112. The SSH VCN 1112 can include an SSH subnet 1114 (e.g. the SSH subnet 914 of FIG. 9), and the SSH VCN 1112 can be communicatively coupled to a control plane VCN 1116 (e.g. the control plane VCN 916 of FIG. 9) via an LPG 1110 contained in the control plane VCN 1116 and to a data plane VCN 1118 (e.g. the data plane 918 of FIG. 9) via an LPG 1110 contained in the data plane VCN 1118. The control plane VCN 1116 and the data plane VCN 1118 can be contained in a service tenancy 1119 (e.g. the service tenancy 919 of FIG. 9).

The control plane VCN 1116 can include a control plane DMZ tier 1120 (e.g. the control plane DMZ tier 920 of FIG. 9) that can include load balancer (LB) subnet(s) 1122 (e.g. LB subnet(s) 922 of FIG. 9), a control plane app tier 1124 (e.g. the control plane app tier 924 of FIG. 9) that can include app subnet(s) 1126 (e.g. similar to app subnet(s) 926 of FIG. 9), a control plane data tier 1128 (e.g. the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 9) and a network address translation (NAT) gateway 1138 (e.g. the NAT gateway 938 of FIG. 9). The control plane VCN 1116 can include the service gateway 1136 and the NAT gateway 1138.

The data plane VCN 1118 can include a data plane app tier 1146 (e.g. the data plane app tier 946 of FIG. 9), a data plane DMZ tier 1148 (e.g. the data plane DMZ tier 948 of FIG. 9), and a data plane data tier 1150 (e.g. the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g. public Internet 954 of FIG. 9).

The Internet gateway 1134 contained in the control plane VCN 1116 and contained in the data plane VCN 1118 can be communicatively coupled to a metadata management service 1152 (e.g. the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171 (1)-(N) may be communicatively coupled to the customer tenancy 1170 and may be configured to transmit or receive data from the customer tenancy 1170. The containers 1171 (1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
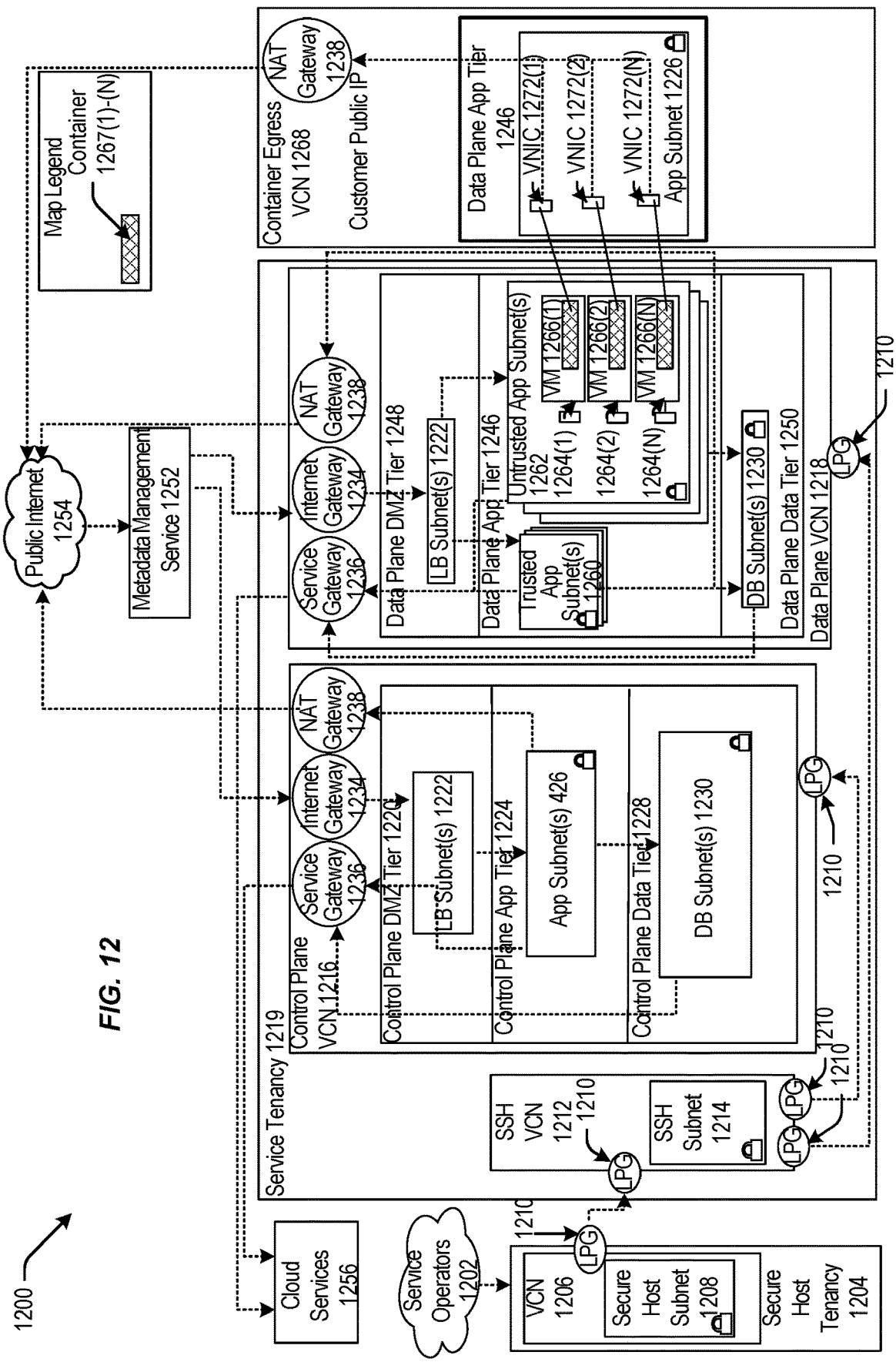
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 902 of FIG. 9) can be communicatively coupled to a secure host tenancy 1204 (e.g. the secure host tenancy 904 of FIG. 9) that can include a virtual cloud network (VCN) 1206 (e.g. the VCN 906 of FIG. 9) and a secure host subnet 1208 (e.g. the secure host subnet 908 of FIG. 9). The VCN 1206 can include an LPG 1210 (e.g. the LPG 910 of FIG. 9) that can be communicatively coupled to an SSH VCN 1212 (e.g. the SSH VCN 912 of FIG. 9) via an LPG 1210 contained in the SSH VCN 1212. The SSH VCN 1212 can include an SSH subnet 1214 (e.g. the SSH subnet 914 of FIG. 9), and the SSH VCN 1212 can be communicatively coupled to a control plane VCN 1216 (e.g. the control plane VCN 916 of FIG. 9) via an LPG 1210 contained in the control plane VCN 1216 and to a data plane VCN 1218 (e.g. the data plane 918 of FIG. 9) via an LPG 1210 contained in the data plane VCN 1218. The control plane VCN 1216 and the data plane VCN 1218 can be contained in a service tenancy 1219 (e.g. the service tenancy 919 of FIG. 9).

The control plane VCN 1216 can include a control plane DMZ tier 1220 (e.g. the control plane DMZ tier 920 of FIG. 9) that can include LB subnet(s) 1222 (e.g. LB subnet(s) 922 of FIG. 9), a control plane app tier 1224 (e.g. the control plane app tier 924 of FIG. 9) that can include app subnet(s) 1226 (e.g. app subnet(s) 926 of FIG. 9), a control plane data tier 1228 (e.g. the control plane data tier 928 of FIG. 9) that can include DB subnet(s) 1230 (e.g. DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g. the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g. the service gateway of FIG. 9) and a network address translation (NAT) gateway 1238 (e.g. the NAT gateway 938 of FIG. 9). The control plane VCN 1216 can include the service gateway 1236 and the NAT gateway 1238.

The data plane VCN 1218 can include a data plane app tier 1246 (e.g. the data plane app tier 946 of FIG. 9), a data plane DMZ tier 1248 (e.g. the data plane DMZ tier 948 of FIG. 9), and a data plane data tier 1250 (e.g. the data plane data tier 950 of FIG. 9). The data plane DMZ tier 1248 can include LB subnet(s) 1222 that can be communicatively coupled to trusted app subnet(s) 1260 (e.g. trusted app subnet(s) 1160 of FIG. 11) and untrusted app subnet(s) 1262 (e.g. untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g. public Internet 954 of FIG. 9).

The Internet gateway 1234 contained in the control plane VCN 1216 and contained in the data plane VCN 1218 can be communicatively coupled to a metadata management service 1252 (e.g. the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
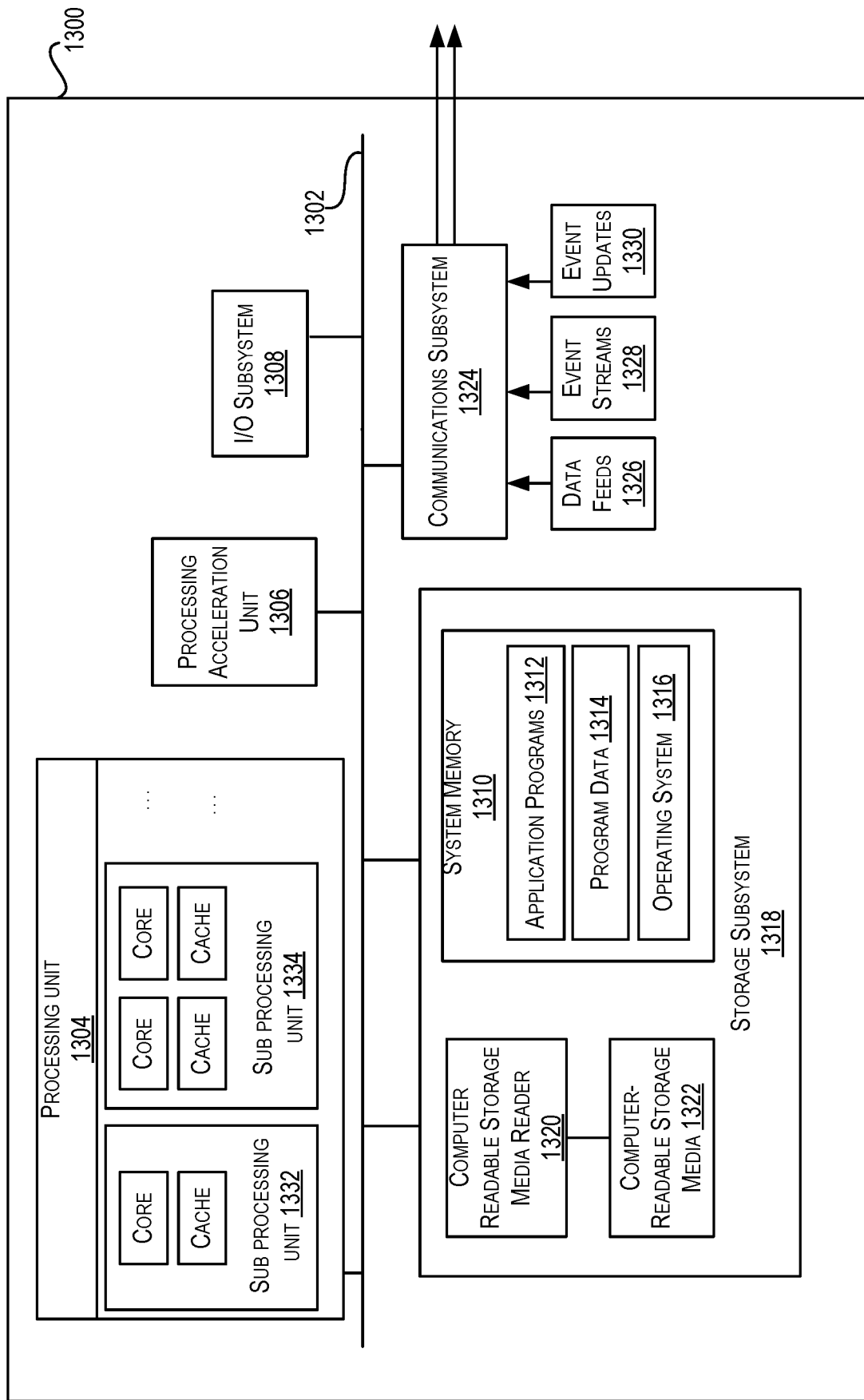
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 13 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present disclosure.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    implementing, at a target data center of a target region, a cross domain system comprising a plurality of nodes forming an ingress channel and an egress channel, the cross domain system communicatively connected to a host data center of a host region, wherein the ingress channel comprises a first data diode enforcing one-way network traffic from the host data center to the target data center, and wherein the egress channel comprises a second data diode enforcing one-way network traffic from the target data center to the host data center;
    receiving, at the cross domain system via the ingress channel, configuration data;
    configuring, using the configuration data, a static node of the plurality of nodes and a receiver node of the plurality of nodes, the static node configured to provide one or more networking protocols and to be communicatively connected to the receiver node;
    receiving, at the receiver node from the host data center via the ingress channel, bootstrapping data;
    storing, at the static node, the bootstrapping data;
    establishing a network connection between the cross domain system and a seed server in the target data center;
    sending, from the static node to the seed server, a portion of the bootstrapping data; and
    performing, by the static node, a bootstrapping operation for the seed server by at least configuring the seed server with the portion of the bootstrapping data.

2. The method of claim 1, wherein the bootstrapping operation further comprises:
    sending, from the static node to the seed server, a second portion of the bootstrapping data;
    configuring the seed server with the second portion of the bootstrapping data; and
    receiving, from the seed server, an indication that the bootstrapping operation is complete.

3. The method of claim 1, wherein the bootstrapping data comprises software images of core services hosted in the host data center, and wherein the portion of the bootstrapping data comprises a first software image of a first core service.

4. The method of claim 1, further comprising configuring the seed server with the portion of the bootstrapping data, the portion comprising an operating system image.

5. The method of claim 1, further comprising:
    configuring, using the configuration data, a sender node of the plurality of nodes, the sender node communicatively connected to the static node; and
    sending, by the sender node to the host data center, telemetry data corresponding to a status of the bootstrapping operation in the target data center.

6. The method of claim 5, wherein the telemetry data is generated by the static node.

7. The method of claim 5, wherein the telemetry data is generated by the seed server.

8. The method of claim 5, wherein the cross domain system is communicatively connected to a deployment system of a orchestration region, and further comprising sending, by the sender node to the deployment system, the telemetry data corresponding to a status of the bootstrapping operation in the target data center.

9. The method of claim 1, wherein the one or more networking protocols comprises dynamic host configuration protocol (DHCP) or trivial file transfer protocol (TFTP).

10. The method of claim 1, wherein the ingress channel comprises an ingress filter, and further comprising filtering, by the ingress filter, the bootstrapping data received via the ingress channel.

11. The method of claim 10, and wherein filtering the bootstrapping data comprises:
   determining whether the bootstrapping data contains prohibited data; and
   removing, based at least in part on a determination that prohibited data is contained in the bootstrapping data, the prohibited data prior to sending the bootstrapping data to the receiver node.

12. The method of claim 5, wherein the egress channel comprises an egress filter, and further comprising filtering, by the egress filter, the telemetry data generated by the static node.

13. The method of claim 12, wherein filtering the telemetry data comprises:
   determining whether the telemetry data contains prohibited exfiltration data; and
   blocking the telemetry data based at least in part on a determination that prohibited exfiltration data is contained in the telemetry data.

14. A cross domain system implemented in a target data center of a target region and communicatively connected to a host data center of a host region, the cross domain system comprising:
   one or more processors; and
   one or more memories storing computer-executable instructions that, when executed with the one or more processors, cause the cross domain system to at least:
      receive, via an ingress channel of the cross domain system, configuration data;
      configure, using the configuration data, a static node and a receiver node, the static node configured to provide one or more networking protocols and to be communicatively connected to the receiver node, wherein the ingress channel comprises a first data diode enforcing one-way network traffic from the host data center to the target data center, and wherein an egress channel comprises a second data diode enforcing one-way network traffic from the target data center to the host data center;
      receive, at the receiver node from the host data center via the ingress channel, bootstrapping data;
      store, at the static node, the bootstrapping data;
      establish a network connection between the cross domain system and a seed server in the target data center;
   send, from the static node to the seed server, a portion of the bootstrapping data; and
   perform, by the static node, a bootstrapping operation for the seed server by at least configuring the seed server with the portion of the bootstrapping data.

15. The cross domain system of claim 14, wherein the one or more memories store further instructions that, when executed with the one or more processors, cause the cross domain system to further:
   send, from the static node to the seed server, a second portion of the bootstrapping data;
   configure the seed server with the second portion of the bootstrapping data; and
   receive, from the seed server, an indication that the bootstrapping operation is complete.

16. The cross domain system of claim 14, wherein the bootstrapping data comprises software images of core services hosted in the host data center, and wherein the portion of the bootstrapping data comprises a first software image of a first core service.

17. The cross domain system of claim 14, wherein the one or more memories store further instructions that, when executed with the one or more processors, cause the cross domain system to further:
   configure, using the configuration data, a sender node, the sender node communicatively connected to the static node; and
   send, by the sender node to the host data center, telemetry data corresponding to a status of the bootstrapping operation in the target data center.

18. A non-transitory computer-readable storage medium storing computer-executable instructions that, when executed with one or more processors, cause a cross domain system to at least:
   receive, via an ingress channel of the cross domain system, configuration data;
   configure, using the configuration data, a static node and a receiver node, the static node configured to provide one or more networking protocols and to be communicatively connected to the receiver node, wherein the ingress channel comprises a first data diode enforcing one-way network traffic from a host data center to a target data center, and wherein the an egress channel comprises a second data diode enforcing one-way network traffic from the target data center to the host data center;
   receive, at the receiver node from a host data center via the ingress channel, bootstrapping data;
   store, at the static node, the bootstrapping data;
   establish a network connection between the cross domain system and a seed server in a target data center;
   send, from the static node to the seed server, a portion of the bootstrapping data; and
   perform, by the static node, a bootstrapping operation for the seed server by at least configuring the seed server with the portion of the bootstrapping data.

19. The computer-readable storage medium of claim 18, storing further instructions that, when executed with the one or more processors, cause the cross domain system to further:
   send, from the static node to the seed server, a second portion of the bootstrapping data;
   configure the seed server with the second portion of the bootstrapping data; and
   receive, from the seed server, an indication that the bootstrapping operation is complete.

20. The computer-readable storage medium of claim 18, storing further instructions that, when executed with the one or more processors, cause the cross domain system to further:
   configure, using the configuration data, a sender node, the sender node communicatively connected to the static node; and
   send, by the sender node to the host data center, telemetry data corresponding to a status of the bootstrapping operation in the target data center.

* * * * *

UNITED STATES PATENT AND TRADEMARK OFFICE
CERTIFICATE OF CORRECTION

PATENT NO. : 12,327,127 B2
APPLICATION NO. : 17/830261
DATED : June 10, 2025
INVENTOR(S) : Adogla Page 1 of 1

It is certified that error appears in the above-identified patent and that said Letters Patent is hereby corrected as shown below:

In the Specification

In Column 1, Line 27, delete "therein." and insert -- therein, --, therefor.

In Column 5, Line 50, delete "require" and insert -- require. --, therefor.

In Column 9, Line 8, delete "deployment" and insert -- Deployment --, therefor.

In Column 13, Line 26, delete "CD S." and insert -- CDS. --, therefor.

In Column 20, Line 66, delete "optimized" and insert -- Optimized --, therefor.

In Column 23, Line 9, delete "VIBE." and insert -- ViBE. --, therefor.

In Column 37, Line 11, delete "CD ROM," and insert -- CD-ROM, --, therefor.

In the Claims

In Column 42, Line 27, in Claim 18, after "wherein" delete "the".

Signed and Sealed this
Twelfth Day of August, 2025

Coke Morgan Stewart
*Acting Director of the United States Patent and Trademark Office*